United States Patent
Kleinikkink et al.

(10) Patent No.: US 11,848,594 B2
(45) Date of Patent: Dec. 19, 2023

(54) CURVILINEAR TRACK SECTIONS HAVING POSITION SENSORS

(71) Applicant: ATS CORPORATION, Cambridge (CA)

(72) Inventors: Albert Kleinikkink, Cambridge (CA); John Ditner, Cambridge (CA); Don Mowat, Cambridge (CA); Ryan Scott, Cambridge (CA); Graham Knap, Cambridge (CA); Ryan Chubb, Cambridge (CA)

(73) Assignee: ATS CORPORATION, Cambridge (CA)

( * ) Notice: Subject to any disclaimer, the term of this patent is extended or adjusted under 35 U.S.C. 154(b) by 105 days.

(21) Appl. No.: 17/141,721

(22) Filed: Jan. 5, 2021

(65) Prior Publication Data

US 2021/0126517 A1   Apr. 29, 2021

Related U.S. Application Data

(63) Continuation of application No. 15/925,275, filed on Mar. 19, 2018, now Pat. No. 10,916,998, which is a
(Continued)

(51) Int. Cl.
*H02K 41/03*     (2006.01)
*H02K 41/035*    (2006.01)
(Continued)

(52) U.S. Cl.
CPC .............. *H02K 41/03* (2013.01); *H02K 1/165* (2013.01); *H02K 11/21* (2016.01); *H02K 15/024* (2013.01);
(Continued)

(58) Field of Classification Search
CPC .... A61K 31/407; A61K 31/437; A61K 31/55; A61K 45/06; A61K 47/6803;
(Continued)

(56) References Cited

U.S. PATENT DOCUMENTS

| 4,749,921 A | 6/1988 | Chitayat |
| 6,191,507 B1 | 2/2001 | Peltier et al. |

(Continued)

OTHER PUBLICATIONS

Canadian Intellectual Property Office as International Searching Authority, International Search Report and Written Opinion on PCT Application No. PCT/CA2015/050492, dated Aug. 12, 2015.

*Primary Examiner* — Minh N Trinh
(74) *Attorney, Agent, or Firm* — Amarok IP Inc.; Neil W. Henderson

(57) ABSTRACT

A curvilinear track section of a linear motor system for use with a moving element including a machine readable medium, the track section including: a curvilinear track portion having a predetermined curved shape; a plurality of sensors provided to the track portion such that each of the plurality of sensors is oriented perpendicular to the direction of motion while the plurality of sensors are placed along the direction of motion and the plurality of sensors are configured such that the machine readable medium will overlap at least two of the plurality of sensors at the same time; and a processor configured to determine a position of the moving element on the curvilinear track section based on the readings from the sensors.

13 Claims, 22 Drawing Sheets

Related U.S. Application Data continuation of application No. 14/725,111, filed on May 29, 2015, now Pat. No. 9,923,444.

(60) Provisional application No. 62/006,583, filed on Jun. 2, 2014.

(51) Int. Cl.
*H02K 41/02* (2006.01)
*H02K 15/02* (2006.01)
*H02K 15/06* (2006.01)
*H02K 11/21* (2016.01)
*H02K 1/16* (2006.01)
*B65G 54/02* (2006.01)

(52) U.S. Cl.
CPC ......... *H02K 15/026* (2013.01); *H02K 15/065* (2013.01); *H02K 15/066* (2013.01); *H02K 41/02* (2013.01); *H02K 41/0358* (2013.01); *B65G 54/02* (2013.01); *Y10T 29/49011* (2015.01)

(58) Field of Classification Search
CPC .... B65G 54/02; C07D 487/04; C07D 487/14; C07D 487/22; C07D 513/22; C07D 519/00; C07K 5/12; H02K 1/165; H02K 11/21; H02K 15/024; H02K 15/026; H02K 15/065; H02K 15/066; H02K 41/02
See application file for complete search history.

(56) References Cited

U.S. PATENT DOCUMENTS

| | | |
|---|---|---|
| 6,239,516 B1 | 5/2001 | Floresta et al. |
| 6,876,896 B1 | 4/2005 | Ortiz et al. |
| 8,232,689 B2 | 7/2012 | Denne |
| 9,923,444 B2 | 3/2018 | Kleinikkink et al. |
| 2002/0130560 A1 | 9/2002 | Botos et al. |
| 2003/0230941 A1 | 12/2003 | Jacobs |
| 2009/0026846 A1 | 1/2009 | Jacobs |
| 2013/0015725 A1 | 1/2013 | Trammell |
| 2018/0212504 A1 | 7/2018 | Kleinikkink et al. |
| 2019/0375597 A1 | 12/2019 | Kleinikkink et al. |
| 2021/0126517 A1* | 4/2021 | Kleinikkink ......... H02K 15/026 |

* cited by examiner

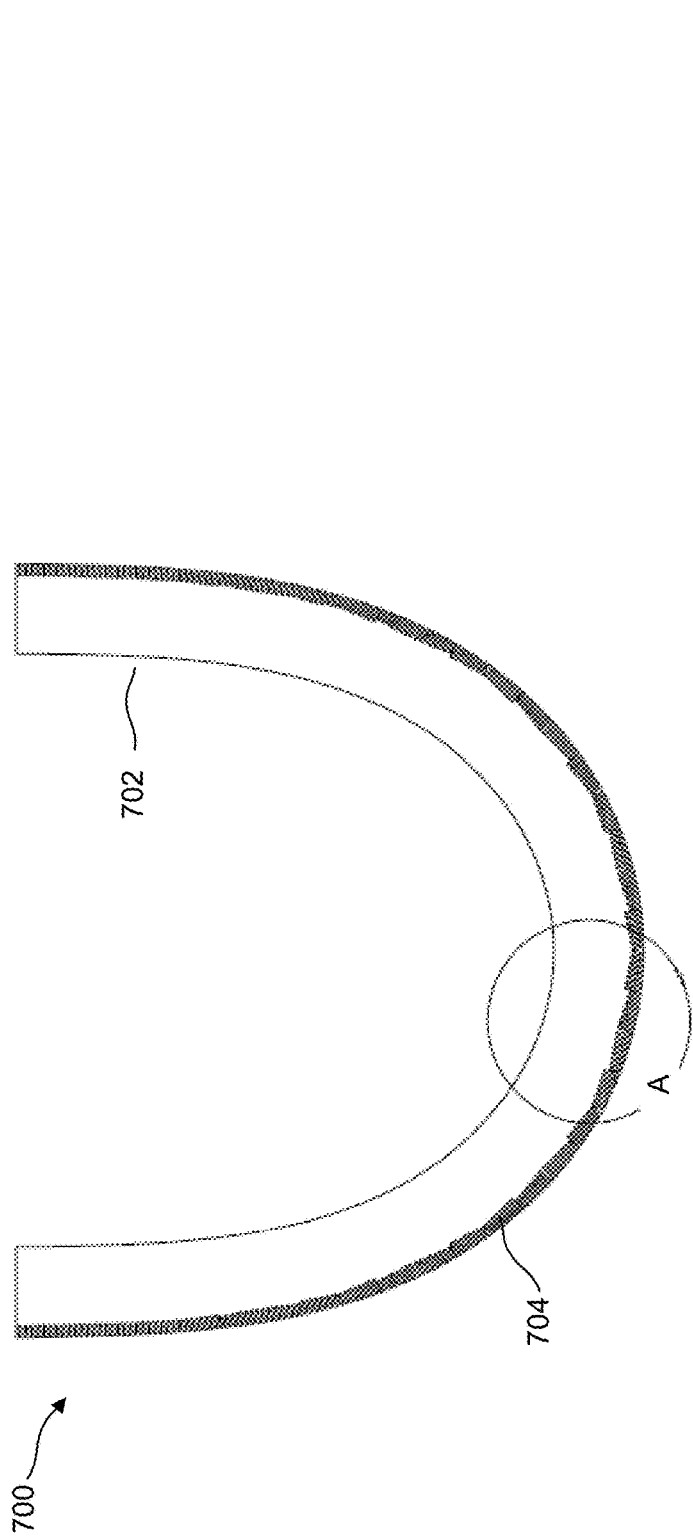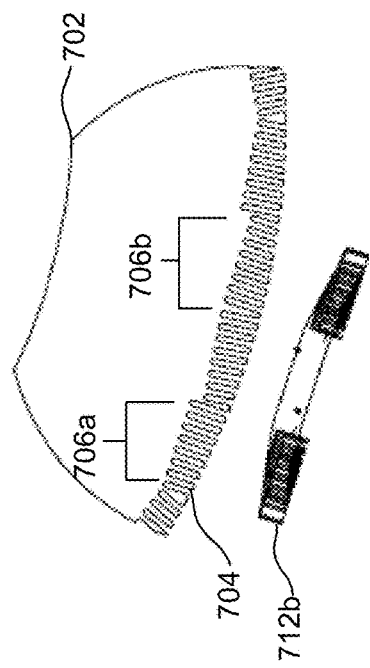

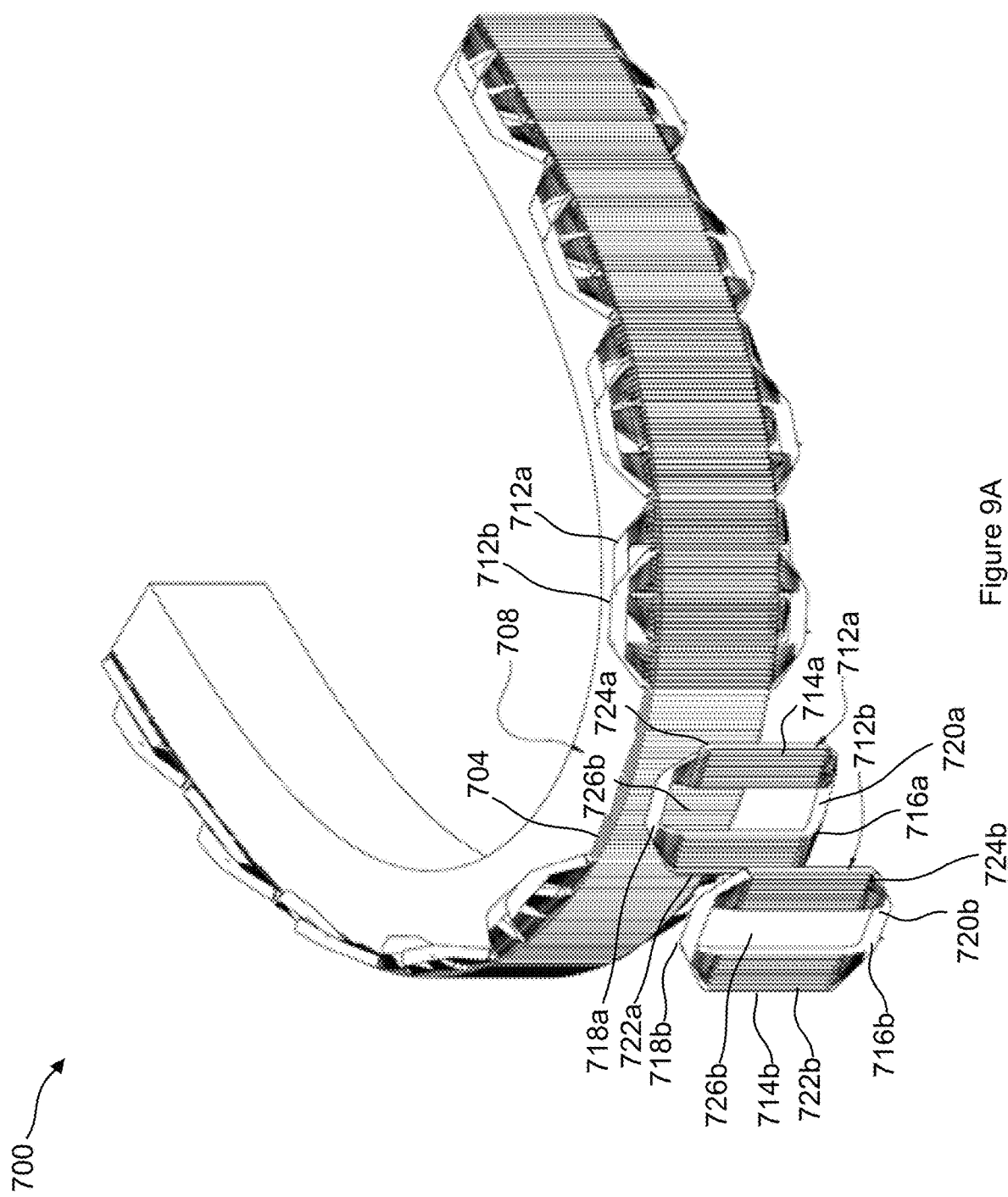

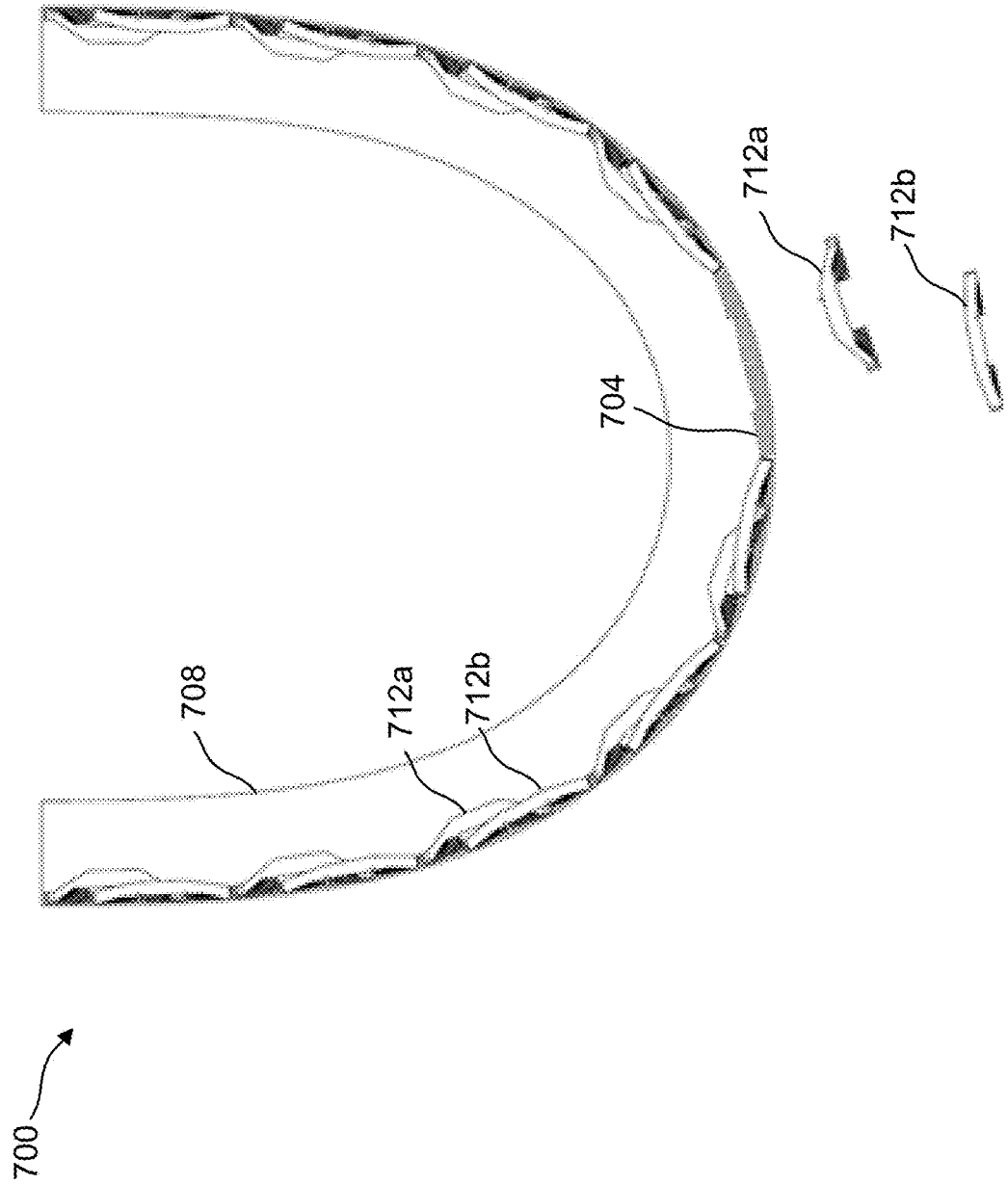

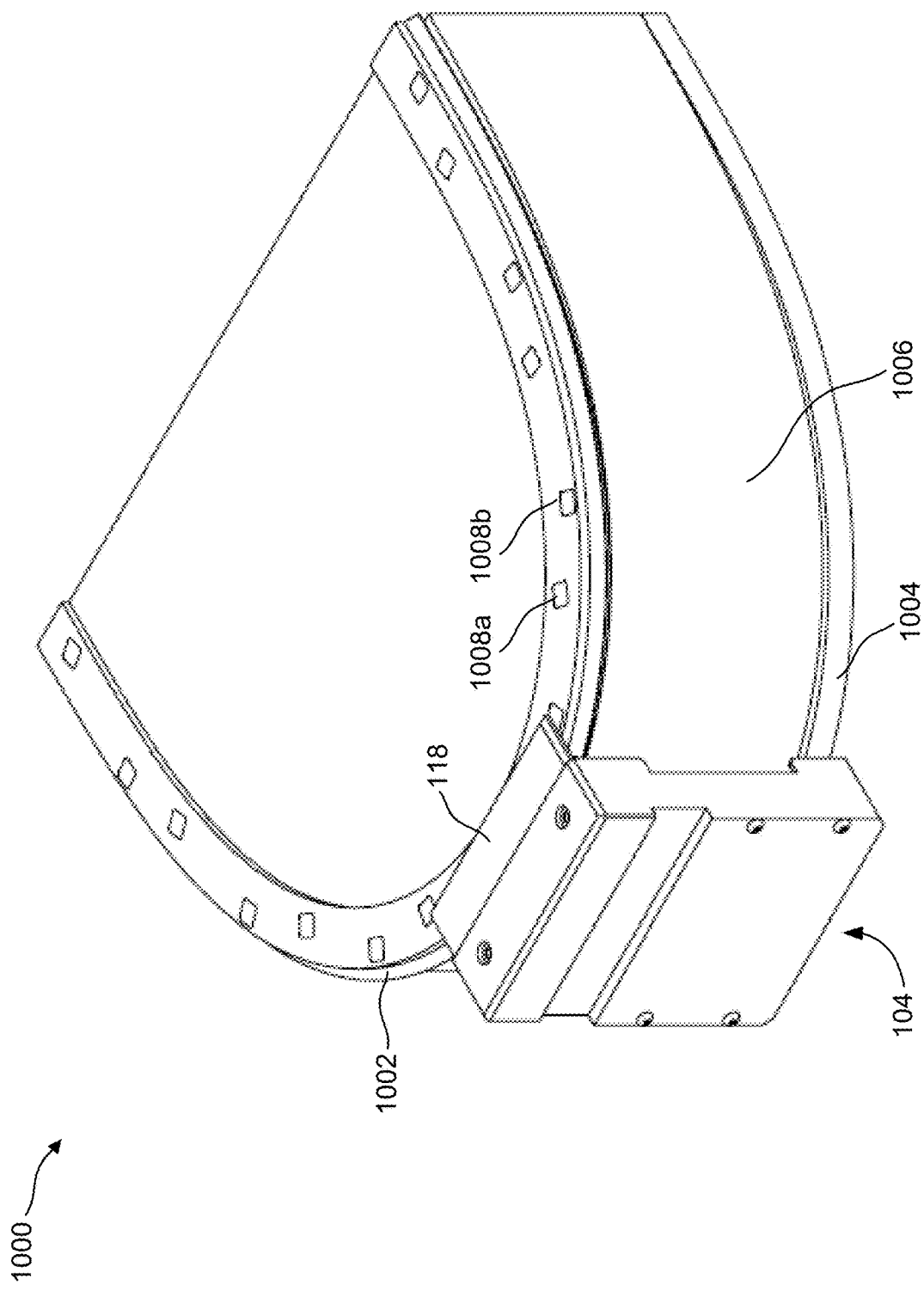

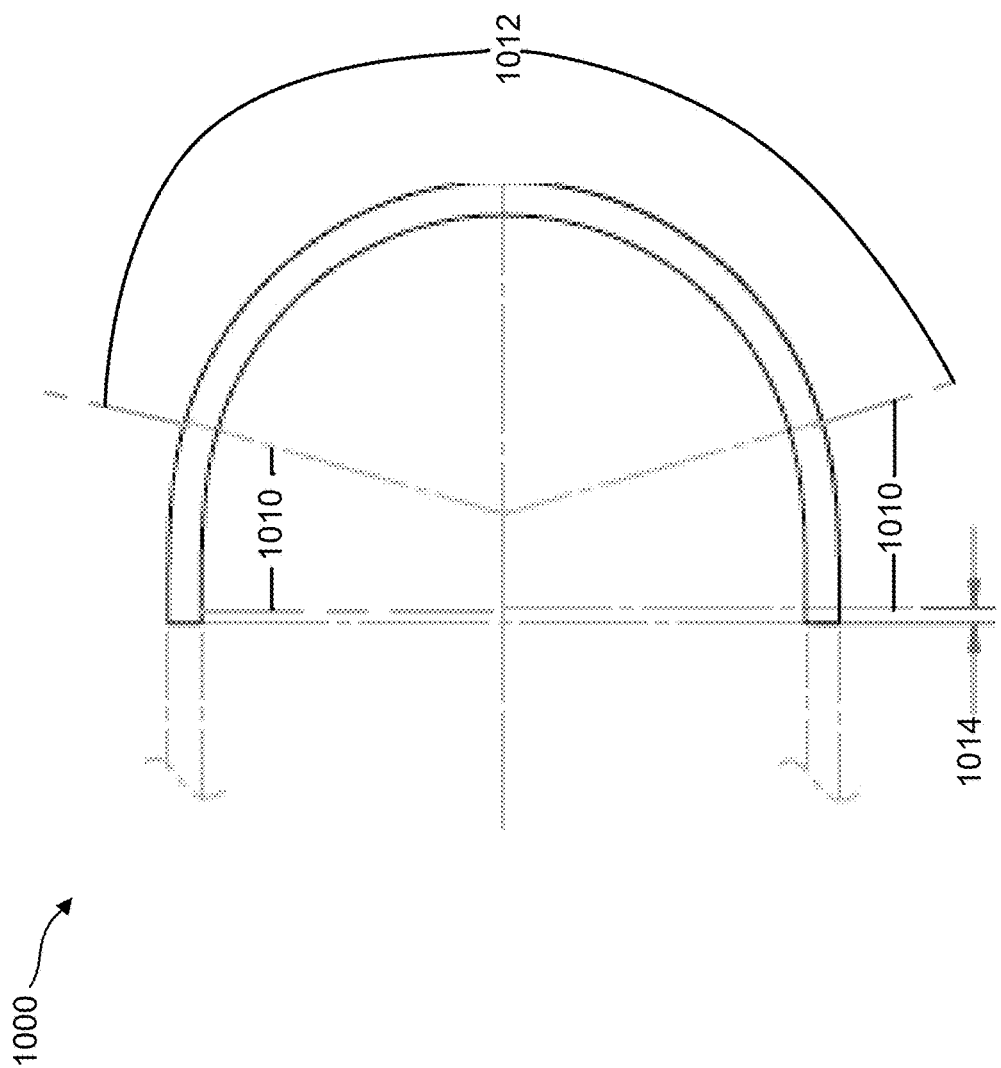

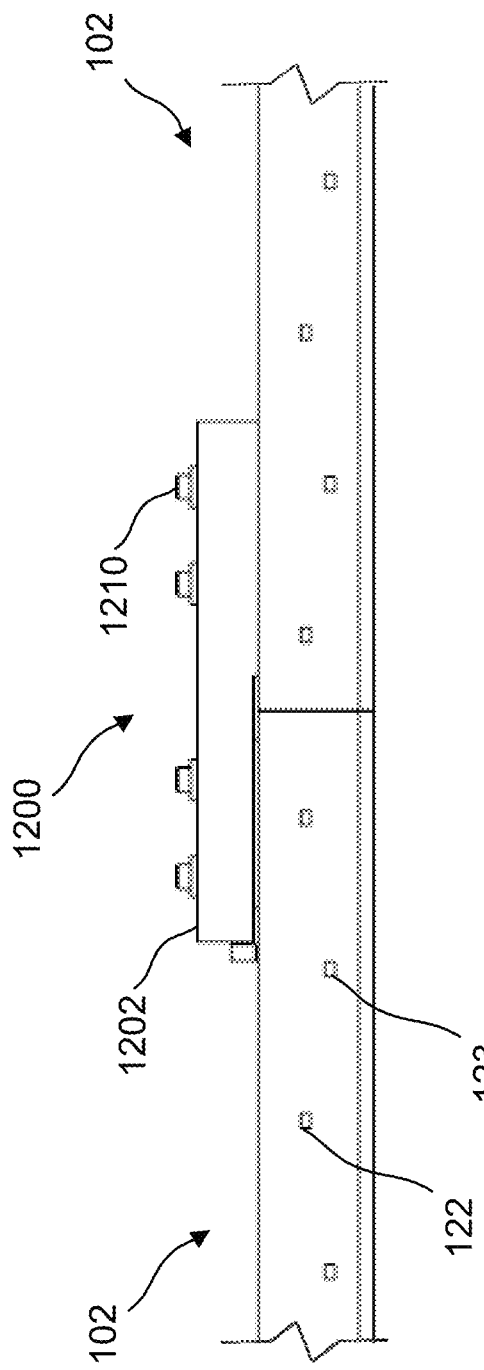
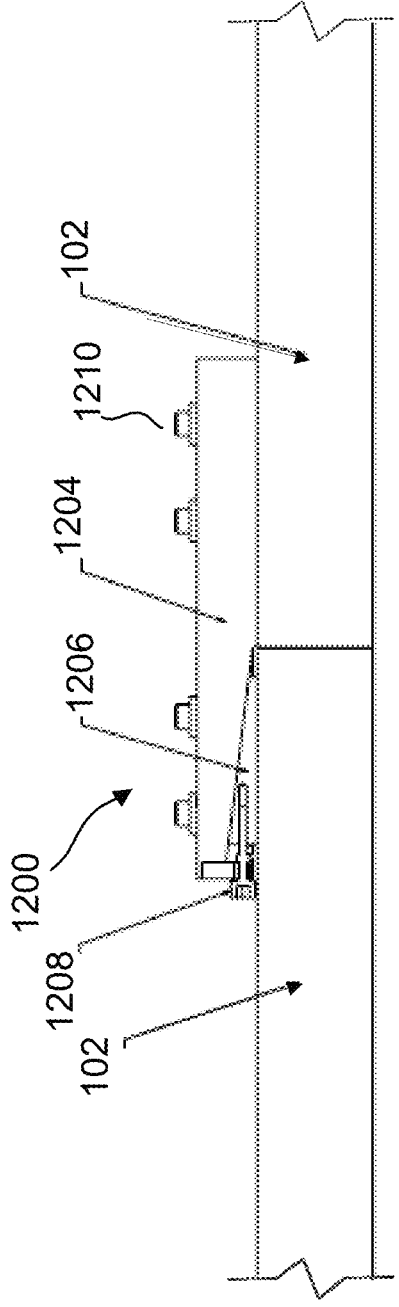

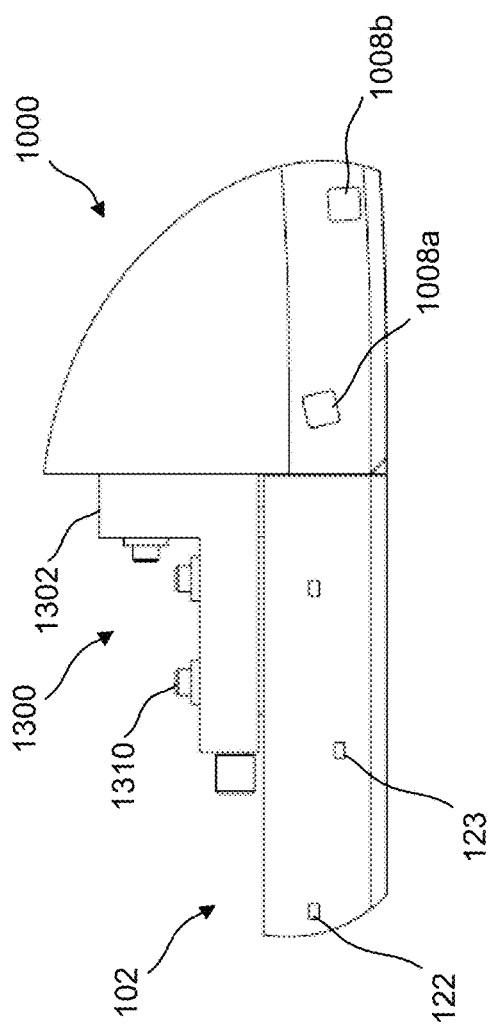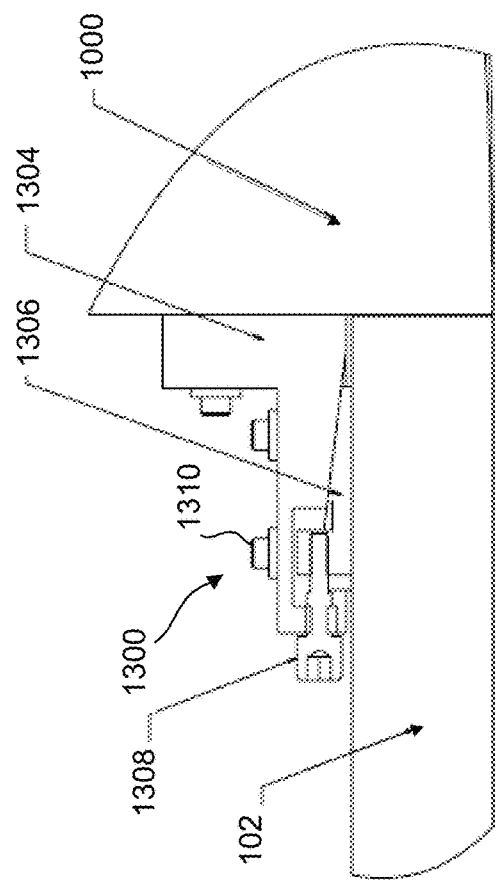

CURVILINEAR TRACK SECTIONS HAVING POSITION SENSORS

RELATED APPLICATIONS

This application is a continuation of U.S. patent application Ser. No. 15/925,275 filed Mar. 19, 2018, now U.S. Pat. No. 10,916,998, which is a continuation of U.S. patent application Ser. No. 14/725,111, filed May 29, 2015, now U.S. Pat. No. 9,923,444, issued Mar. 20, 2018, which claims priority from U.S. Provisional Application Ser. No. 62/006,583 filed on Jun. 2, 2014, all of which are incorporated herein by reference.

FIELD

The present disclosure relates generally to linear motor systems. More particularly, the present disclosure relates to a linear motor system with powered curvilinear track sections.

BACKGROUND

Conventional linear motor systems may be constrained where there are curvilinear or curved sections of track for various reasons. For example, as the radius of the curved section is smaller towards the interior of the curve than the exterior of the curve, conventional linear motor systems and, in particular, linear motor conveyor systems, may encounter problems with the arrangement and configuration of their motor coils through the curve.

Further, conventional linear motor systems with curvilinear or curved sections of track may produce unwanted forces on a moving element traversing a curved track section. For example, the unwanted forces may be caused by undesirable rates of change of acceleration, often called "jerk", as the moving element moves through the curve. This "jerk" can lead to instability of the moving element and any objects on the moving element, such as a workpiece, fixtures, or the like.

Conventional linear motor systems may also have difficulty tracking moving elements when the moving elements traverse a curvilinear or curved section of track and/or during transition to straight sections of track.

As such, there is a need for an improved curvilinear track section for linear motor systems.

SUMMARY

In one aspect, there is provided a method for manufacturing a curvilinear track section of a linear motor system, the method includes: forming a curvilinear track portion into a suitable shape; cutting out a first slot grouping from an exterior edge of the curvilinear track portion, wherein the first slot grouping is at a first predetermined angle relative to the exterior edge of the curvilinear track portion; cutting out a second slot grouping from the exterior edge of the curvilinear track portion, wherein the second slot grouping is at a second predetermined angle relative to the exterior edge of the curvilinear track portion; and inserting motor units into the first and second slot groupings.

In a particular case, each of the first and second slot groupings may include pairs of slot groupings and the pairs of slot groupings interleave.

In another particular case, the curvilinear track portion and the first and second slot groupings may be configured to provide a sinusoidal angular velocity profile for moving elements on the curvilinear track section.

In still another particular case, the curvilinear track portion may have at least one region with a clothoid profile. In some cases, this region may be a transition region.

In yet another particular case, the cutting out of the first group of slots and the second group of slots may be by stamping, laser cutting, or water jet cutting.

In yet another particular case, slots within each slot grouping may have different slot depths.

In a particular case, the depth of each slot may depend on the angle of the slot relative the exterior edge of the curvilinear track portion.

In another particular case, the depth of the slot may be configured to receive a motor unit.

In still another particular case, the depth of the slot on one end of the first slot grouping and the depth of the slot on another end of the first slot grouping are approximately equal to the depth of a straight section of the linear motor system and the depths of the slots in between are deeper.

In another aspect, there is provided a curvilinear track section of a linear motor system having: a curvilinear track portion having a predetermined curved shape; a first slot grouping formed in an exterior edge of the curvilinear track portion, wherein the first slot grouping is at a predetermined angle relative to the exterior edge of the curvilinear track portion; a second slot grouping formed in the exterior edge of the curvilinear track portion, wherein the second slot grouping is at a second predetermined angle relative to the exterior edge of the curvilinear track portion; and motor units inserted into the first and second slot groupings.

In a particular case, each of the first and second slot groupings may include pairs of slot groupings and the pairs of slot groupings interleave.

In another particular case, the curvilinear track portion and the first and second slot groupings may be configured to provide a sinusoidal angular velocity profile for moving elements on the curvilinear track section.

In still another particular case, the curvilinear track portion has at least one region with a clothoid profile.

In yet another particular case, slots within each slot grouping may have different slot depths.

In still yet another particular case, the depth of the slot may depend on the angle of the slot relative the exterior edge of the curvilinear track portion.

In a particular case, the depth of the slot on one end of the first slot grouping and the depth of the slot on another end of the first slot grouping may approximately equal to the depth of a straight section of the linear motor system and the depths of the slots in between are deeper.

In still another particular case, the curvilinear track section may include a plurality of sensors positioned on the curvilinear track section, wherein the sensors are oriented perpendicular to the direction of motion.

In a particular case, a first sensor of the plurality of sensors may be calibrated based on the calibration of a last sensor on a straight track portion immediately preceding the curvilinear track selection.

In another particular case, the curvilinear track section may include a controller configured to provide a boost to a selected motor unit when a moving element approaches an apex of the curvilinear track section.

In another aspect, there is provided a wedge aligner for a linear motor system, the wedge aligner including: a fixed mount configured to rigidly attach to a first track section of the linear motor system and flexibly attach to a second track section; a wedge configured be inserted between the flexibly attaching portion of the fixed mount and the second track section; and an adjustor provided to the wedge configured to translate the wedge back and forth along the longitudinal axis of the first and second track sections in order to compensate for stack-up tolerances.

BRIEF DESCRIPTION OF FIGURES

Embodiments of the present disclosure will now be described, by way of example only, with reference to the attached Figures.

FIG. 7A is a top view of a powered curvilinear track section according to an embodiment;

FIG. 7B is an expanded top view of a portion of the powered curvilinear track section of FIG. 7A;

FIG. 7C is an expanded top view of a portion of the powered curvilinear track section of FIG. 7A with a motor unit;

FIG. 9A is a perspective view of the powered curvilinear track section with motor coils;

FIG. 9B is a top view of the powered curvilinear track section with motor coils;

FIG. 10B is a perspective view of the curvilinear track section with sensors;

FIG. 11 is a top view of the curvilinear track section with clothoid profile, according to an embodiment;

FIGS. 12A and 12B are a top view of two adjacent straight track sections joined using a wedge aligner, according to an embodiment;

FIGS. 13A and 13B are a top view of a straight track sections and a curvilinear track section joined using a wedge aligner, according to an embodiment;

DETAILED DESCRIPTION

Generally, the present disclosure provides a system and method for powered curvilinear track sections in a linear motor system or conveyor that is intended to overcome at least some of the limitations of conventional linear motor systems.

Figure 1:
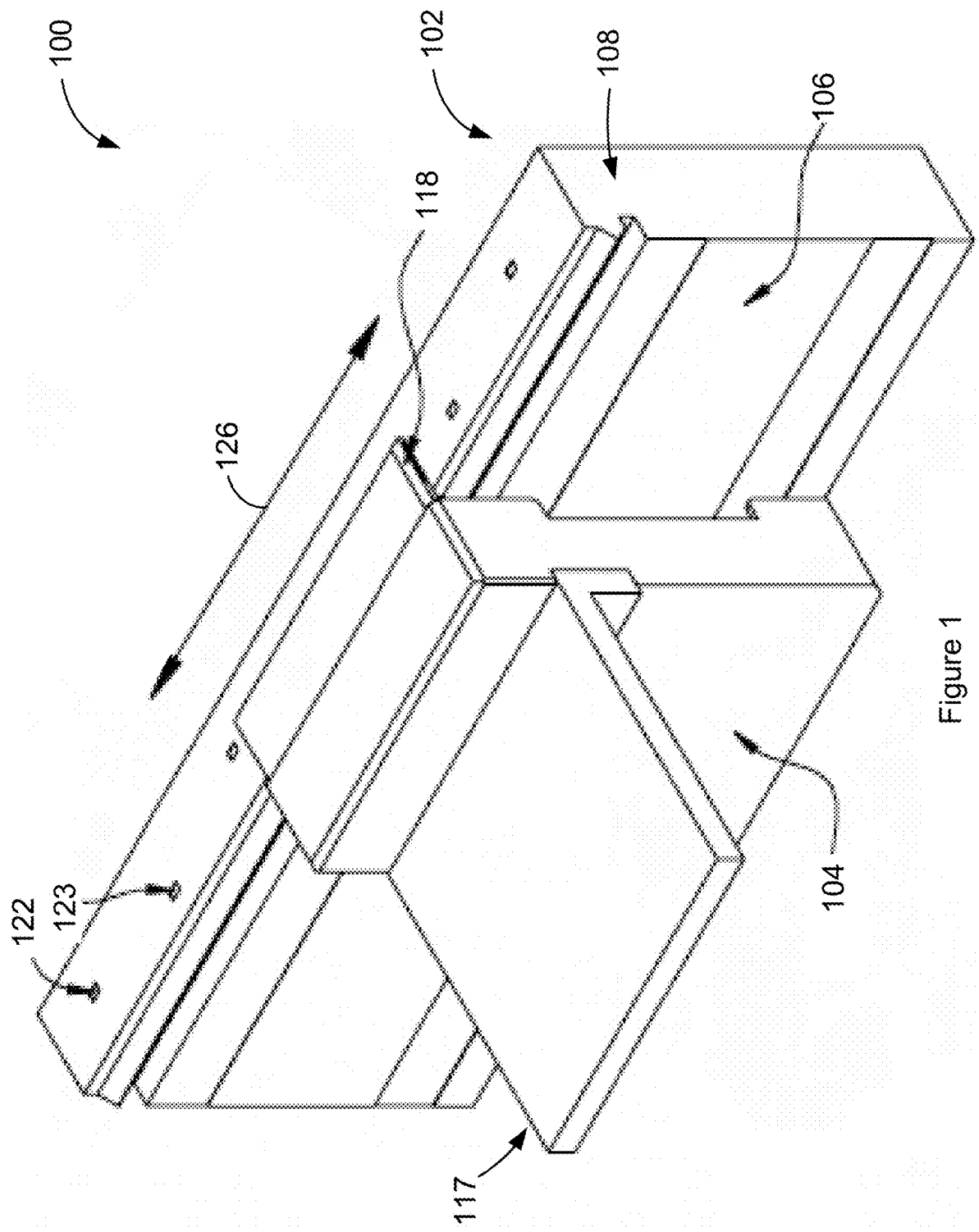
FIG. 1 illustrates a perspective view of a track section of a linear motor conveyor system.

FIG. 1 illustrates a conveyor system 100 having a track section 102. The track section 102 features one or more moving elements 104 (only one is illustrated) which are configured to ride or travel along a track 106 of the track section 102. The moving element 104 may be any appropriate transport structure and may be configured to carry, support, or otherwise transport a support, such as, for example, a pallet, platform, carriage, staging, bed or the like. The track 106 includes a frame 108 configured to support the moving element 104. Some of the principles of operation of a similar track section are described in more detail in U.S. Pat. No. 8,397,896 to Kleinikkink et al., which is hereby incorporated herein by reference.

The conveyor system 100 can be composed of a plurality of track sections 102 which are mechanically self-contained and quickly and easily separable from one another so as to be modular in nature. In this embodiment, the track sections 102 are mounted on a support (not shown) so as to align and abut one another in order to form a longer track. In order to be modular, each track section 102 may house self-contained electronic circuitry for powering and/or operating the track section 102. The conveyor system 100 may include curvilinear track sections 102.

Figure 2A:
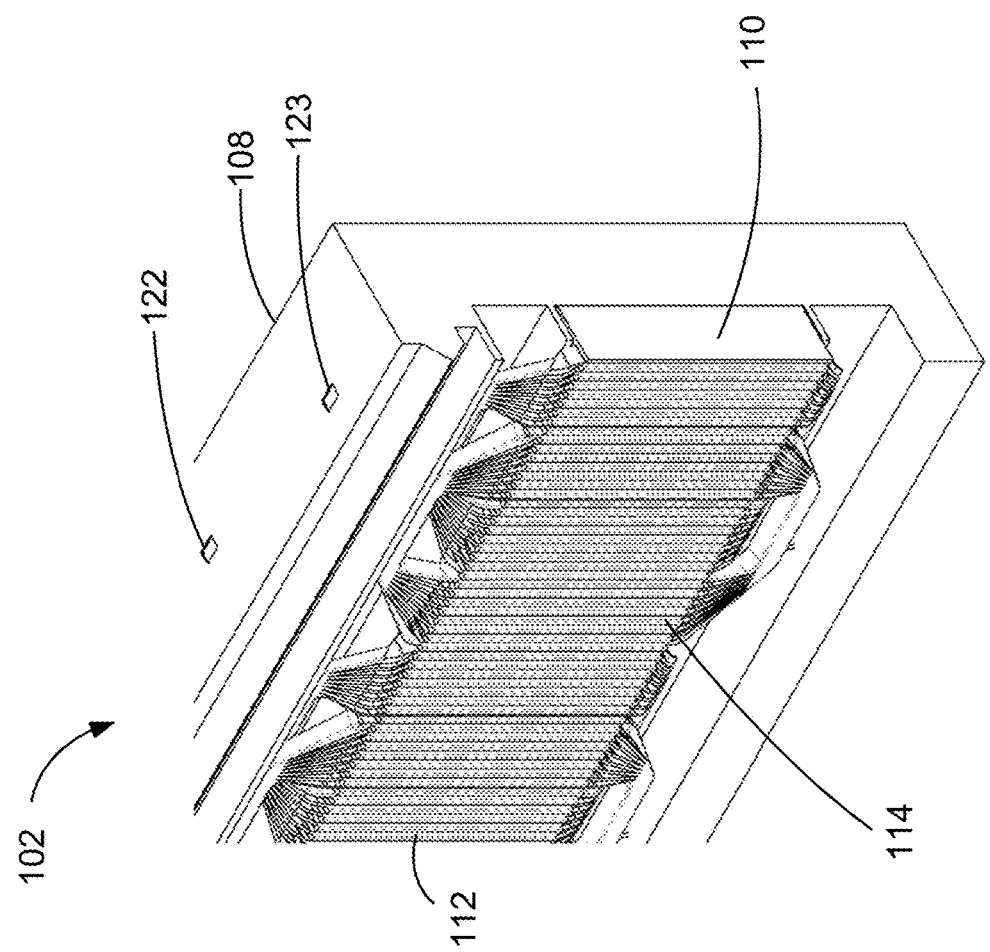
FIG. 2A illustrates a perspective view of the track section.
Figure 2B:
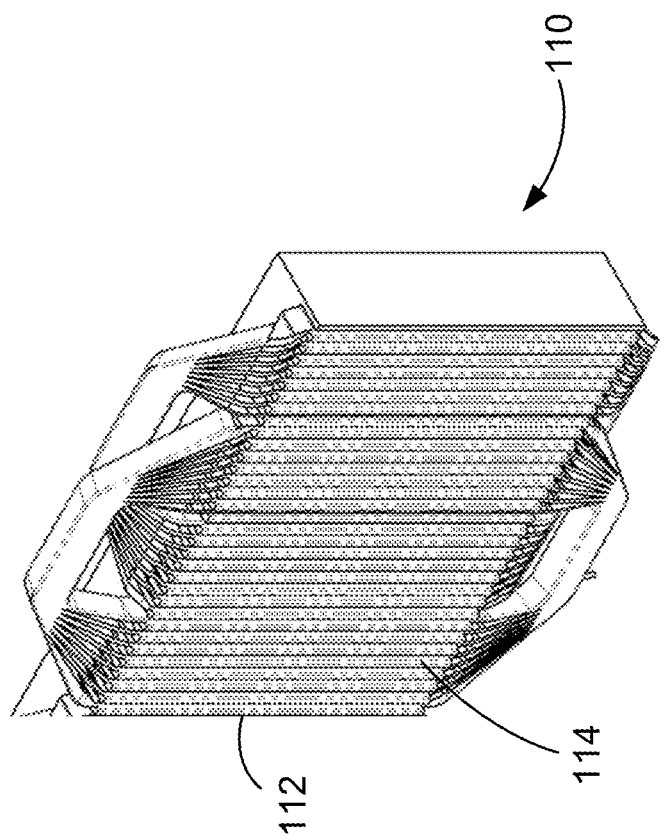
FIG. 2B illustrate an exploded view of coils of the track section.
Figure 2C:
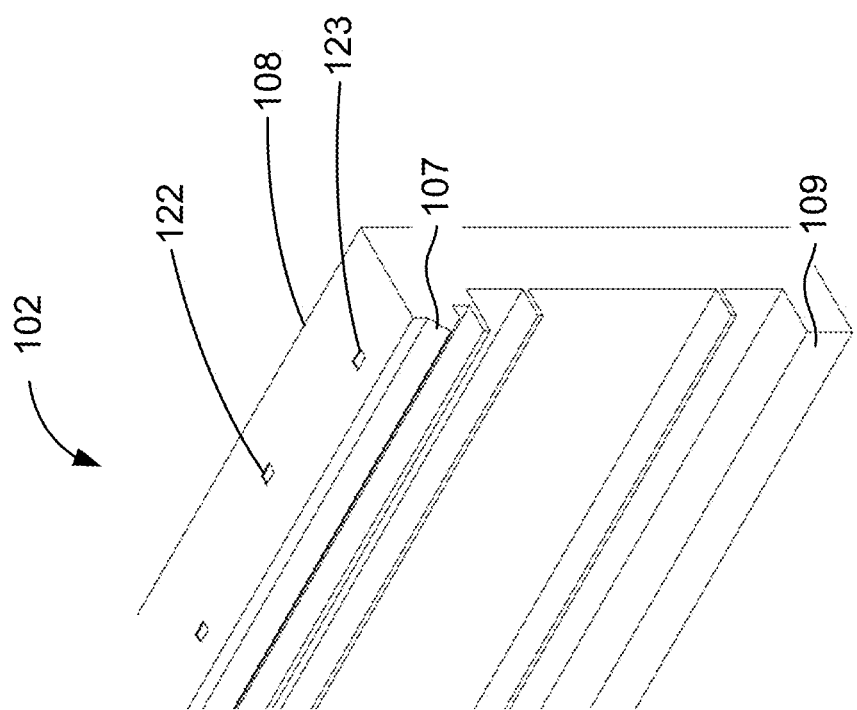
FIG. 2C illustrates an exploded view of the track section.

FIG. 2A illustrates a perspective view of the track section 102. FIGS. 2B and 2C illustrate an exploded view of the track section 102. The track section 102 includes the frame 108 that houses a linear drive mechanism 110. The linear drive mechanism 110 is formed as a stator armature 112 including a plurality of embedded coils 114. The embedded coils can be individually excited so that an electrically-induced magnetic flux produced by the stator armature 112 is located adjacent to a given moving element 104 to be controlled, in a direction normal thereto, without affecting adjacent moving elements 104. The motive force for translating each moving element 104 arises from the magneto-motive force (MMF) produced by each moving element 104 and the stator armature 112, i.e., by the tendency of the corresponding magnetic fluxes provided by the stator armature 112 and moving element 104 to align. A controller (described below) enables separate and independent moving MMFs to be produced along the length of the track section 102 for each moving element 104 so that each moving element 104 can be individually controlled with a trajectory profile that is generally independent of any other moving element 104. Structurally, the track section 102 may thus be broadly classified as a moving-magnet type linear brushless motor having multiple moving elements 104.

FIG. 2C illustrates a section of track 102 which includes a first guide rail 107 and a second guide rail 109 configured to support the moving element 104. The first and second guide rails 107, 109 are designed such that the moving element 104 may be removed from the track 102 when a magnetic force is overcome. The magnetic force is overcome, for example, where a user pries the moving element 104 away from the track 106. In an alternative, the moving element 104 may be removed from the track 106 where the magnetic force is reversed, reduced, or removed.

The first guide rail 107 supports the moving element 104 vertically and horizontally. The first guide rail 107 may have a "V" shaped profile to support and guide the moving element 104 on the track 102. The second guide rail 109 supports the moving element 104 horizontally. The second guide rail 109 may be a smooth surface with a flat profile.

Referring again to FIG. 1, each moving element 104 includes a shelf 117 for carrying various components. The moving element 104 also has an extension 118 provided with a machine readable medium 120 (indicated in FIG. 4), which may be, for example, a magnetic strip, an optically receptive, transmissive or reflective strip, capacitive strip, color-coded strip, other type of feedback system or the like. The extension 118 is configured such that the machine readable medium 120 interacts with sensors 122, 123 provided to the track 106. The sensors 122, 123 are configured to read the machine readable medium 120, whether magnetically, optically, or otherwise. The machine readable medium 120 and sensors 122, 123 form a position sensing system. The position sensing system may be arranged such that the position sensing system is protected from traffic on the track section 102 and dust and other debris. The position sensing system is employed in the moving element 104 identification and position-detecting subsystem (described in further detail below).

The sensors 122, 123 are located on the track section 102 and the machine readable medium 120 is located on the moving element 104. In an alternative, the sensors 122, 123 may be located on the moving element 104 and the machine readable medium 120 may be located on the track section 102. The sensors 122, 123 may be configured to read an identifier of the moving element 104 from the machine readable medium 120. The same sensors 122, 123 are configured to gather data to determine a relative position of the moving element 104 on the track section 102 from the machine readable medium 120.

Figure 3:
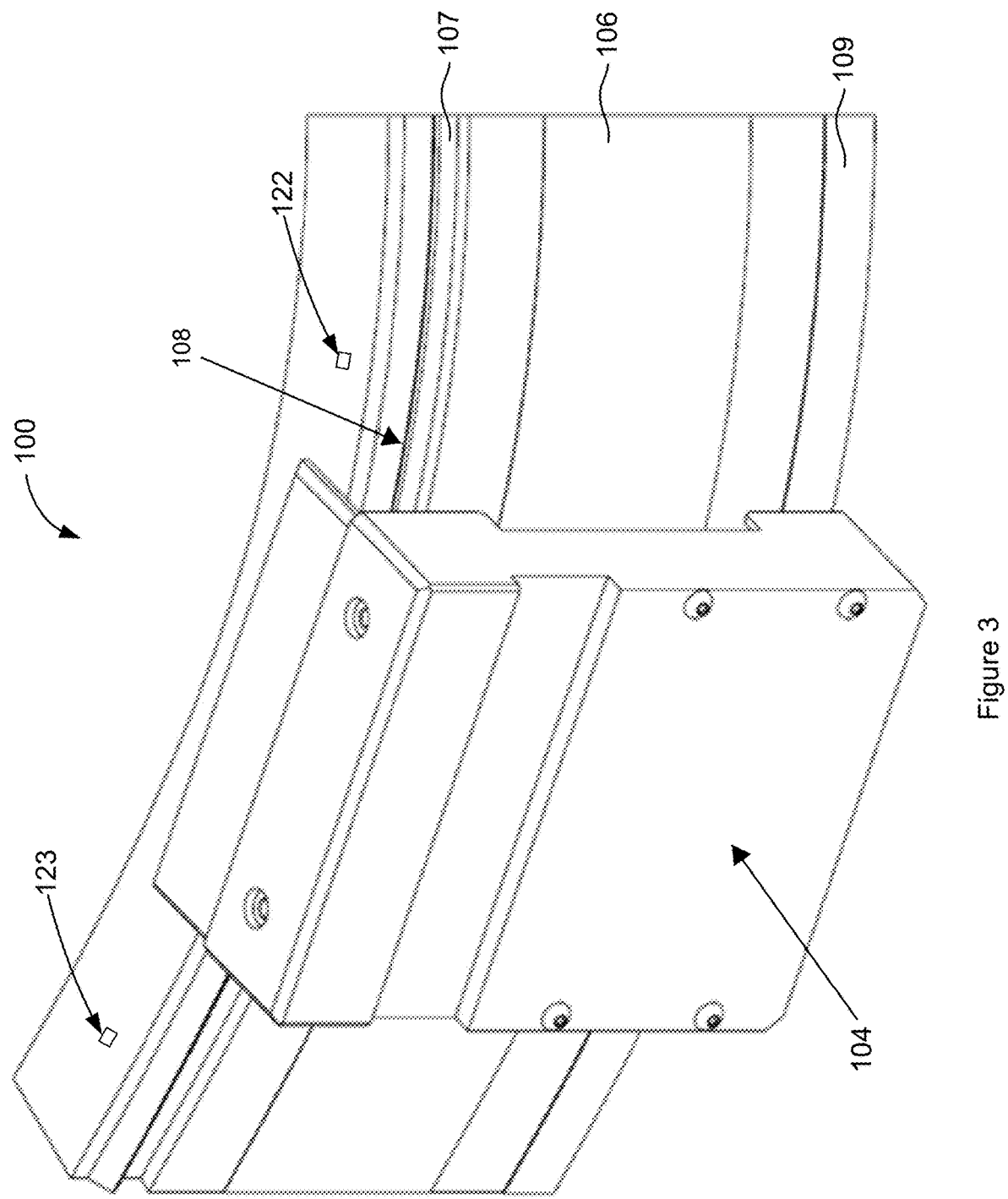
FIG. 3 illustrates a perspective view of a track section with a curvilinear profile.

FIG. 3 illustrates a conveyor system 100 having a curvilinear profile, in accordance with a further embodiment. Where the track section 102 is curvilinear, the sensors 122, 123 are positioned along the curvilinear profile such that the machine readable medium 120 can be read by the sensors 122, 123 and the readings can then be translated from the curvilinear profile to a linear profile, using linear units such as microns, for the purposes of feedback control. Control of the moving element 104 may then occur in the linear profile/linear units. Curvilinear or curved sections of track will be described in further detail below.

Figure 4A:
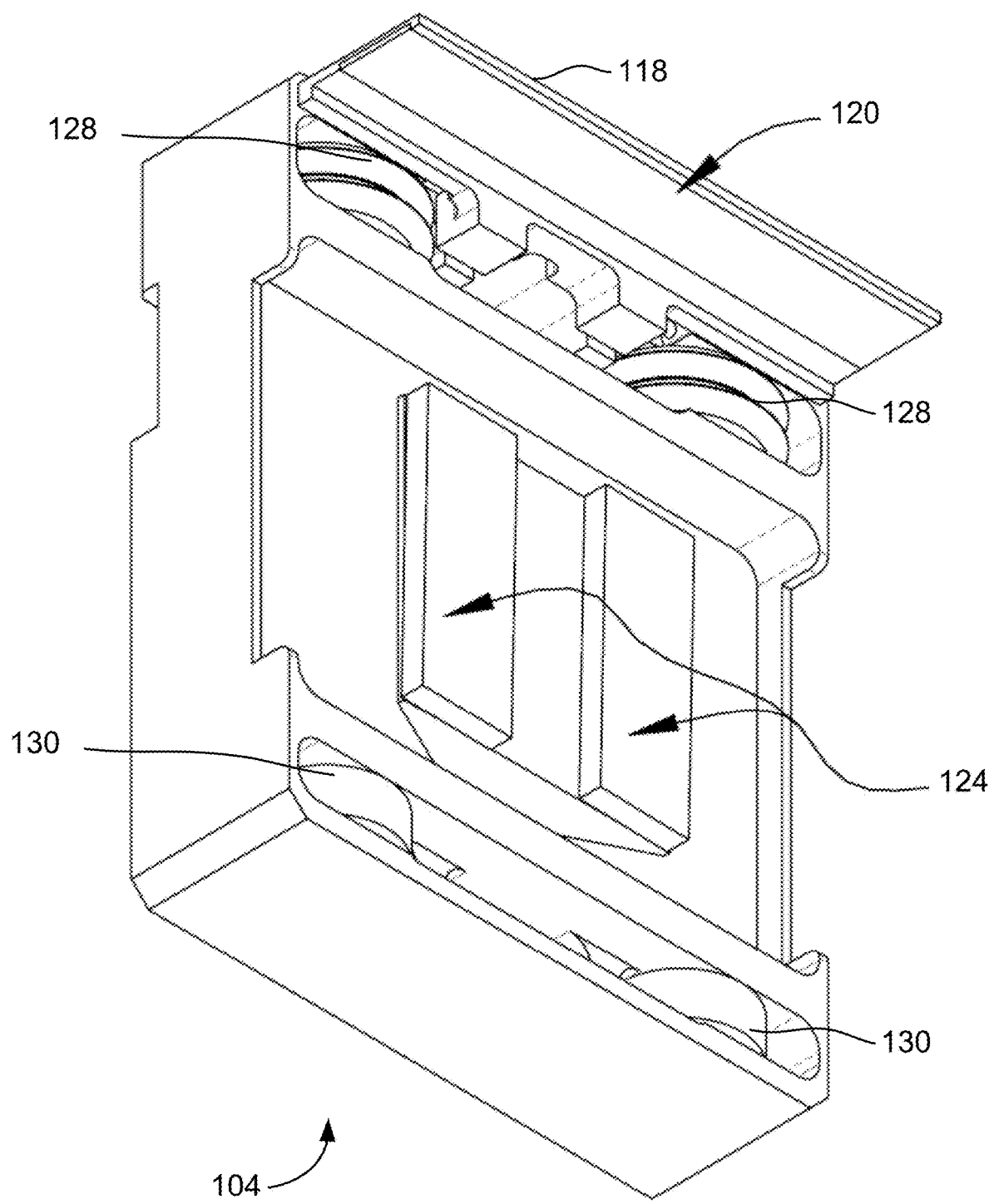
FIG. 4A illustrates a perspective view of a moving element 104.
Figure 4B:
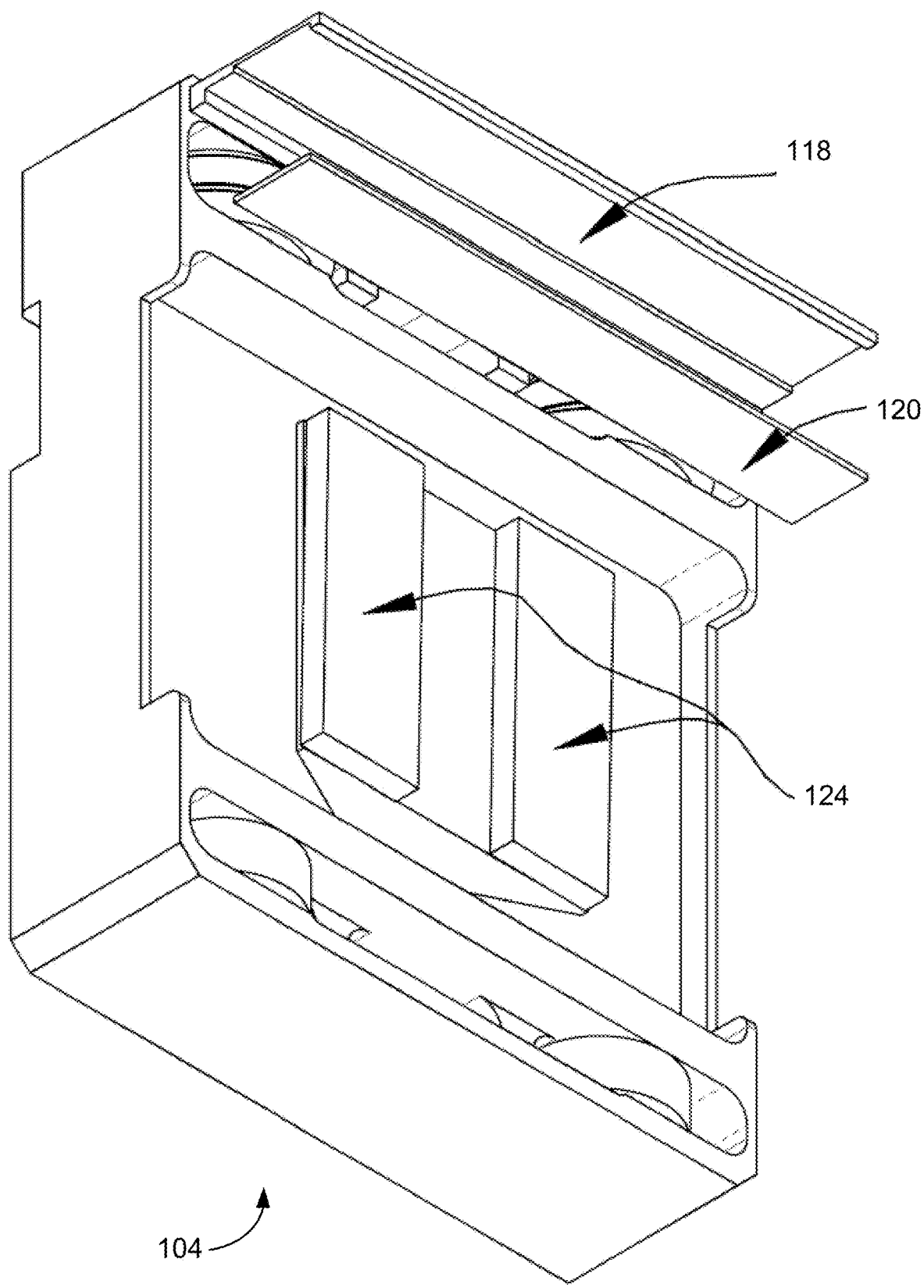
FIG. 4B illustrates a perspective view of a moving element 104 separated from a machine readable medium.

FIGS. 4A and 4B show a moving element 104 when removed from the track 106. The moving element 104 has the machine readable medium 120 on the extension 118. The machine readable medium 120 is read by the sensors 122, 123 to provide data used to determine the moving element 104's position as the moving element 104 travels along the track 106. This position feedback is then used to control the movement of the moving element 104. The moving element 104 has elements 124, such as permanent magnets, that interact with the stator armature 112 and coils 114 in the corresponding track section 102 to move along direction 126 of FIG. 1.

The moving element 104 has a first set of bearings 128 and a second set of bearings 130. In this embodiment, the first set of bearings 128 is located above the second set of bearings 130. The first and second set of bearings 128, 130 may be wheel bearings that are rotatably attached to the moving element 104 around a shaft (not shown).

The first set of bearings 128 rides on the first guide rail 107. The first set of bearings 128 has an edge profile that corresponds to the profile of the first guide rail 107. In one embodiment, the first set of bearings 128 has a "V" shaped profile that matches the opposite "V" shape profile of the first guide rail 107. The first set of bearings 128 may alternately have a "U" shaped profile or another appropriately shaped profile intended to support the moving element 104 along the vertical axis. In some cases, the moving element 104 may have one or more bearings for the first set of bearings 128.

The second set of bearings 130 rides on the second guide rail 109. The second set of bearings 130 has an edge profile that corresponds to the profile of the second guide rail 109. In an embodiment, the second set of bearings 130 has a flat profile (e.g., a flat wheel) that matches the flat profile of the second guide rail 109. The second set of bearings 130 may be configured to roll a bit higher or lower on the second guide rail 109 to adapt to any non-parallelism with the first guide rail 107. In some cases, the second set of bearings 130 includes one or more bearings.

Higher precision is intended to be achieved over conventional conveyors by supporting the moving element 104 with magnetic force and the first set of bearings 128 to control the moving elements 104 along the vertical axis and the transverse axis of the track, including position and rotation. In certain cases, the first set of bearings 128 precisely constrains the moving element 104 along the vertical axis and the transverse axis of the track and precisely constrains pitch rotation and yaw rotation. The first set of bearings 128 provides precise movement and positioning along the longitudinal axis of the track with roll rotation about the longitudinal axis being constrains by the second set of bearings 130.

The second set of bearings 130 is intended to constrain rotation of the moving element 104 about the longitudinal axis of the track. In a particular embodiment, the moving element 104 has two "V" shaped bearings 128 and two flat bearings 130. The two shaped bearings 128 and the two flat bearings 130 (four bearings in total) are intended to provide increased stability in rotation about the vertical axis or the longitudinal axis of the track. This may allow for payloads mounted to the moving element 104 that have higher cantilever moments than would be available with a three bearing configuration. With four bearings 128, 130, the center of gravity of an added payload that is mounted to the moving element 104 may also be shifted farther away from the track 102.

Figure 5:
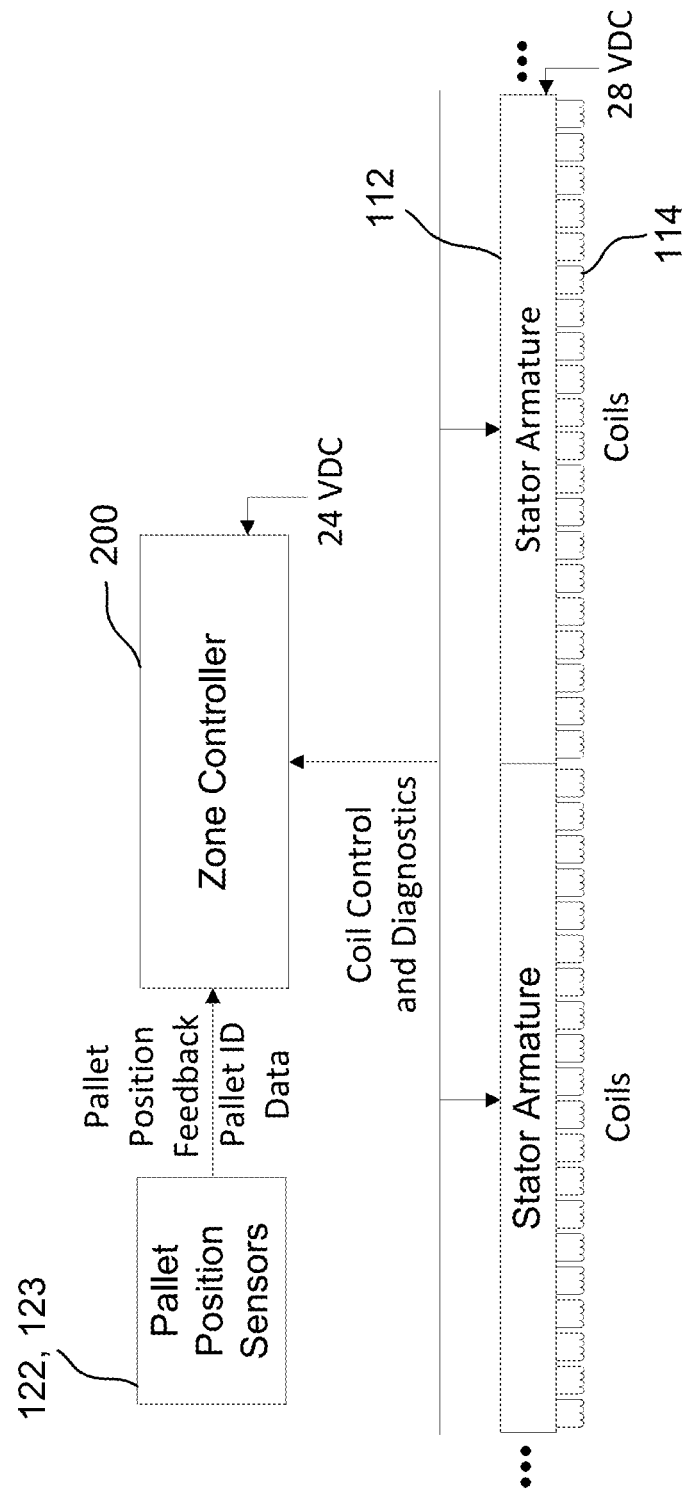
FIG. 5 is a schematic of a control architecture for a conveyor system, according to an embodiment.

FIG. 5 is a block diagram of an embodiment of a control architecture 201 employed in the conveyor system 100. Zone controller 200 controls a zone of the conveyor system 100 and the track 102 used in the zone of the conveyor system 100. A zone may include any number of coils. The coils may be grouped into 'motors'. In a particular example, a motor may include twenty interleaved coils. The motors may be equivalent in length to track sections 102; however this is not required as motors can include coils from more than one, or less than one, track section 102. The zone controller 200 may be used to interface with users of the system. The zone controller 200 is configured to monitor moving element 104 positions and control the movement of moving elements 104 to go to desired destinations based on the moving element 104 position. As such, the zone controller 200 can be used for process (i.e. manufacturing-line) control. The zone controller 200 may also provide a supervisory diagnostic role by monitoring the track sections 102 (e.g., by engaging in a continuous polling or pushing process) in order to determine the current status of any track section 102 and whether any track section 102 has failed. It will be understood that, in some cases, the zone controller 200 may directly control each of the track sections 102 or each of the motors.

The zone controller 200 may also be connected to other devices, such as programmable logic controllers (PLCs) (not shown) via input/output (I/O), network modules, software modules, Ethernet connections, or the like. The PLCs may provide manufacturing-line station-processing instructions to the zone controller 200, such as directing the next destination for a moving element 104 along the track 102, or providing station-specific motion instructions in respect of a given moving element 104.

As illustrated, the zone controller 200 is operatively connected to the stator armature 112 and coils 114 in the track sections 102 and controls the coils 114 in accordance with an independent trajectory or "move" command for each moving element 104 located therein.

The zone controller 200 is also operatively connected to the sensors 122 situated in the track section 102. The zone controller 200 is used to implement a closed-loop digital servo control system that controls movement of the moving element 104 by resolving the real-time position of each moving element 104 located in the track section 102. When the machine readable medium 120 of a given moving element 104 moves over a given sensor 122, moving element 104 position feedback is transmitted to the zone controller 200. The zone controller 200 decodes the moving element 104 position feedback to determine the position of the moving element 104.

The zone controller 200 provides processing for sampling the sensors 122, 123 and resolving the position of each moving element 104 located in the associated track section 102. Broadly speaking, the processing associates the machine readable medium 120 of any given moving element 104 with the identified sensors 122, 123 at any time so that a position, relative to the track section 102, of the given moving element 104 can be calculated based on a fixed position of the associated sensor 122 or 123 and a relative position of the machine readable medium 120 in relation to the associated sensor 122 or 123. In addition, when the machine readable medium 120 simultaneously engages a plurality of sensors 122, 123, the processing transfers or hands-off the association or "ownership" of the moving element 104 from the current sensor 122 or 123 to an adjacent engaged sensor 122 or 123. In this manner, the position of an identified moving element 104 relative to the track section 102 can be continuously tracked.

Those skilled in the art will appreciate that the position sensing system may be magnetic, optical, color optical, capacitive, or may be another alternative system. For example, the machine readable medium can be a magnetic strip and the sensors 122, 123 can be corresponding magnetic detectors. Such an embodiment may provide very fine resolution. In some cases the machine readable medium can be configured to provide 1 micron or better resolution. The position accuracy of the moving element 104 is only limited by the resolution of the position sensing system.

Figure 6:
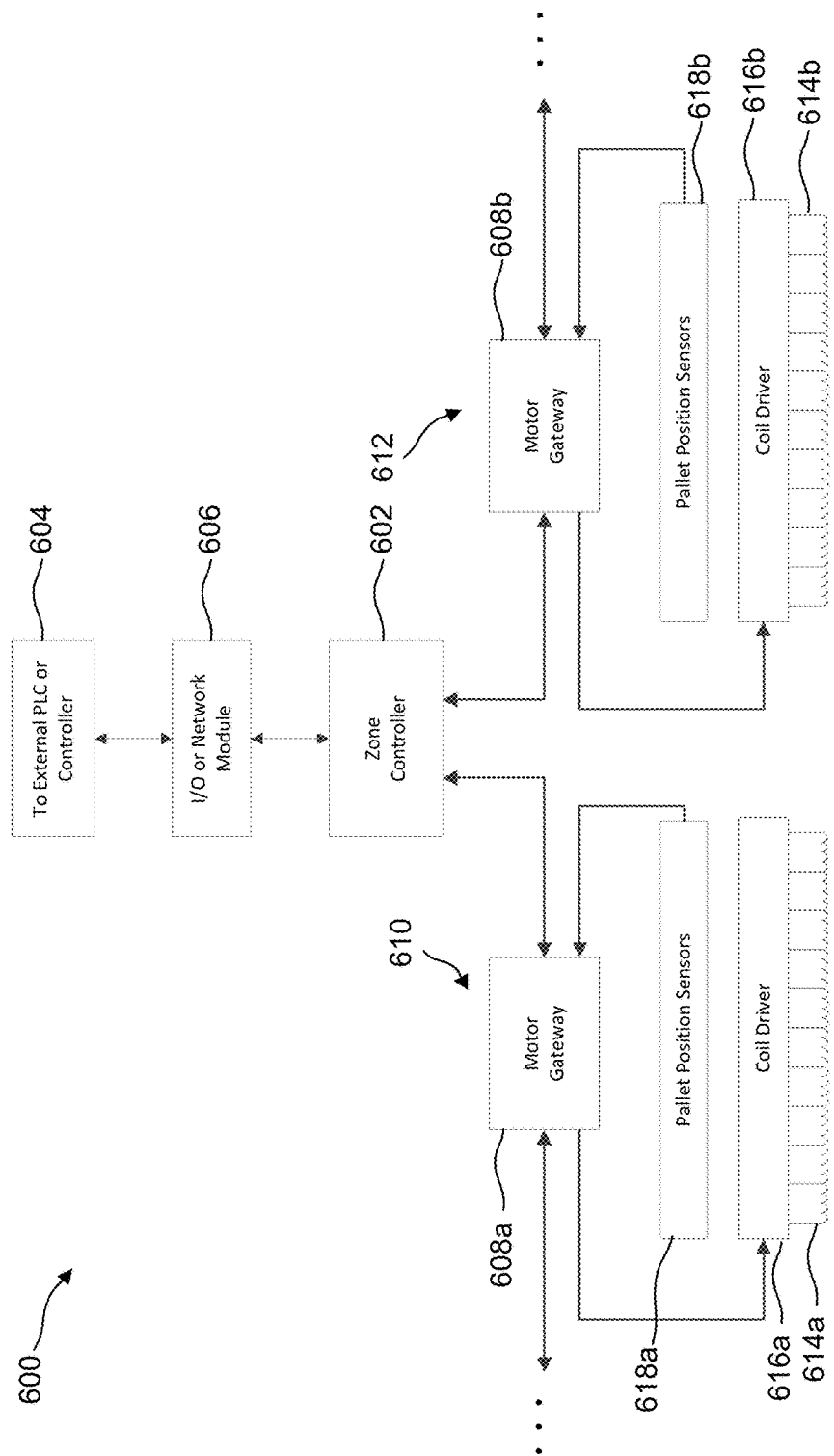
FIG. 6 is a schematic of a control architecture for a conveyor system, according to another embodiment.

FIG. 6 illustrates another embodiment of control architecture 600 for a linear motor conveyor. In this embodiment, the control architecture 600 includes a zone controller 602. The zone controller 602 may be connected to other devices, such as programmable logic controllers (PLCs) 604 via input/output (I/O), network modules, software modules, Ethernet connections, or the like 606.

The zone controller 602 interfaces with and controls one or more motor gateways 608. In this example, as will be discussed, the motor gateway 608a is located on a left network 610 of motor gateways and motor gateway 608b is located on a right network 612 of motor gateways. Each network 610, 612 may have the motor gateways 608 connected in series. In some cases, each network 610, 612 may include two independent communication channels, a "command channel" and a "response channel". The channels may have bidirectional or unidirectional data flow, and may operate independently of each other. The command channel may be responsible for transmitting data from the zone controller 602 to the motor gateways 608, and the response channel may be responsible for transmitting data from the motor gateways 608 to the zone controller 602.

Each motor gateway 608 controls a number of coils grouped into a 'motor' 614 through power electronics circuits, in this case a coil driver 616. The coil drivers 616 contain circuitry that drives current to the coils in the motor 614. The power electronics may also include thermistors (not shown) for temperature monitoring. The motor gateways 608 send coil current set point data to the coil driver 616. The motor gateways 608 also receive moving element 104 raw position data from the moving element 104 position sensors 618 which may be passed along to the zone controller 602.

In some cases, the processing of the position, and the driving, of the moving element 104 will take place solely in the zone controller 602. The motor gateways 608 will relay only raw position sensor data to the zone controller 602. In addition, the motor gateways 608 will receive coil current set points from the zone controller 602 to drive the coil driver 616. The processing of the input raw position data to allow output the coil current set points may be centralized in the zone controller 602. In some cases, the motor gateways 608 may have a feedback control structure to ensure the coils in the motor 614 do not substantially deviate from the coil current set point received from the zone controller 602.

Where there are curvilinear or curved track sections in a linear motor conveyor system, conventional systems are typically constrained. As the radius of the curved section is smaller towards the interior of the curve than the exterior of the curve, conventional linear motor conveyor systems typical encounter problems. In order to overcome this difference in radius, some conventional systems have coils that fan out towards the exterior of the curve, which may cause inconsistencies in magnetic flux. Other conventional systems may have each loop of the coil in the curved section at a different angle than the loops adjacent to it; which may be difficult to construct and may require complex control systems to drive the coils. As well, with coils that fan out or at different angles, there may be substantial difficulty in constructing and operating interleaved coils.

Conventional linear motor conveyor systems with curvilinear or curved track sections may produce unwanted forces on a moving element traversing the curved track section. The excessive forces may be caused by undesirable rates of change of acceleration, hereinafter called a "jerk". The jerk can have unwanted consequences of shifting components being carried by the moving element. The jerk may be especially pronounced at the transition point between the curved section of track and a straight section of track. Some conventional conveyor systems may limit the speed of the moving elements as they travel through the curved track section to minimize jerk. However, limiting speed may constrain conveyor system throughput. In some other conventional conveyor systems, the system configuration is limited such that certain stations or processes are only completed on straight sections of track prior to, or after, moving elements travel through the curved sections of track.

Conventional linear motor conveyor systems also may have different bearings/wheels of a moving element experience different forces or rotate at a different speed than other bearings/wheels of the moving element. This effect may be especially pronounced where the moving element travels on a top surface of a track. This effect may produce undesirable wear on the bearings/wheels and require that the bearings/wheels be made out of expensive material to resist wear, or require that expensive and complex differential systems be implemented on the moving element.

Conventional linear motor conveyor systems may have difficulty tracking moving elements while the moving elements are traversing a curvilinear or curved section of track. Some conventional linear motor conveyor systems use a different sensor system for curved track sections than straight track sections, which may add cost and complexity to the conveyor system.

Turning to FIGS. 7A, 7B and 7C, a top view of a powered curvilinear track section 700, according to an embodiment, is shown. FIGS. 7B and 7C illustrate an expanded view of section 'A' in FIG. 7A. The powered curvilinear track section 700 includes a curvilinear track portion 702, sometimes referred to as a curvilinear lamination portion because, in some embodiments, the track portion 700 is formed as a lamination of several layers. FIG. 7A illustrates the curvilinear lamination portion 702 as a single piece of lamination, but the curvilinear lamination portion 702 may be composed of multiple pieces of lamination attached to each other. The curvilinear lamination portion 702 may be made of any material that is structurally resilient and provides a suitable magnetic path; for example, a silicon steel or electrical steel such as AISI M19, or the like.

As best illustrated in FIGS. 7B and 7C, the curvilinear lamination portion 702 is provided with a plurality of slots 704 positioned around the exterior of the curvilinear lamination portion 702. The slots 704 may be grouped into a plurality of slot groupings 706. In the example of FIGS. 7A to 7C, each slot grouping 706 may include eight slots 704; however, the slot groupings 706 can include any number of slots 704 to match the coil configuration in an accompanying motor unit 712 (which will be described below). The slots 704 in a slot grouping 706 may be approximately parallel to one another. The slots 704 may be angled relative to the curved edge of the curvilinear lamination portion 702. The slot groupings may come in pairs, as illustrated by a first slot grouping 706a (slot grouping 1) and a second slot grouping 706b (slot grouping 2) in FIGS. 7B and 7C. The pairs of slot groupings 706 will be approximately parallel to allow the straight coils of the motor units 712 to be inserted straight into the curvilinear lamination stack; as illustrated in FIG. 7C where motor unit 712b is lined up for insertion into slot grouping 1 706a and slot grouping 2 706b. The pair of slot groupings 706 may be spaced such that there is one slot grouping 706 intermediate the pair of slot groupings 706 to allow for interleaved motor units, as described below. The slots 704 in a slot grouping 706 may have different depths depending on the angle of the slot grouping 706 relative to the curved edge of the curvilinear lamination portion 702. The slots 704 can be any suitable depth as long as the motor unit can be appropriately inserted in the slots 704, without being so deep as to materially affect the structural integrity of a lamination stack (as described below). The slots 704 may have different depths without substantially affecting the control of the moving element 104 because the curvilinear lamination portion 702 is configured to provide a smooth magnetic path as described herein.

The angle of the pair of slot groupings 706 may be determined, for example, by: determining the midpoint between the pair of slot groupings 706; determining the tangent to the curve of the exterior edge of the curvilinear lamination portion 702 at that midpoint; determining the line perpendicular to the tangent; and determining the direction of the perpendicular line relative to the exterior edge of the curvilinear lamination portion 702. The direction of the perpendicular line is the direction of all the slots 704 in the pair of slot groupings 706 relative to the exterior edge of the curvilinear lamination portion 702.

In another example, the depths of the slots 704 can be determined by cutting the depths of the farthest-left slot 704 on the slot grouping 1 706a and the farthest-right slot on the slot grouping 2 706b the same depth as would be cut for a straight section 102 of track. The slots 704 in between the farthest-left and farthest-right slots 704 are cut deeper to allow the motor unit 712 to be inserted straight in, where the innermost slots 704 may be cut with the deepest depth due to the curvilinear profile of the track section 700.

Figure 8:
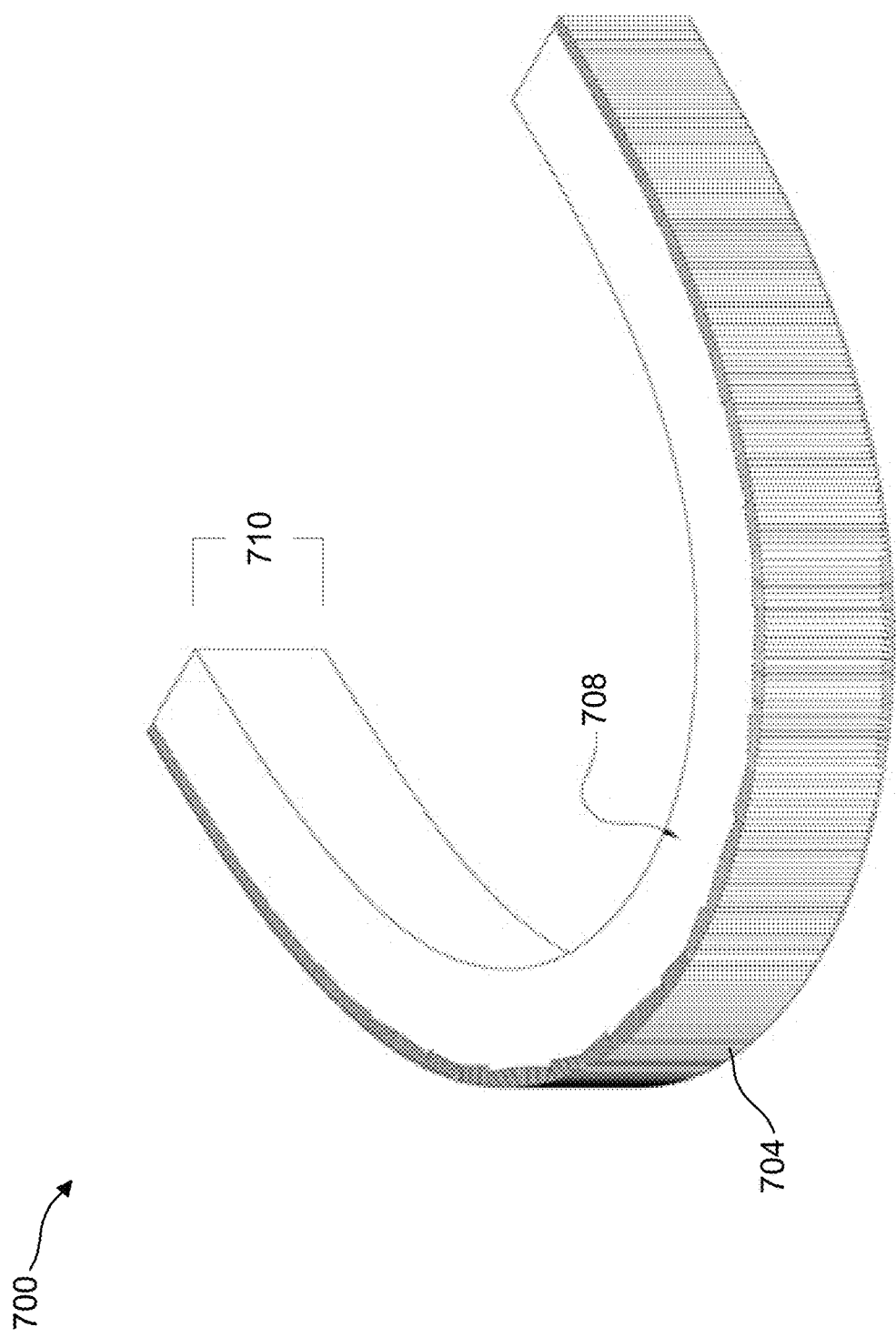
FIG. 8 is a perspective view of the powered curvilinear track section with stacked laminations.

Turning to FIG. 8, a perspective view of the powered curvilinear track section 700 is shown. The powered curvilinear track section 700 is shown as a curvilinear lamination stack 708. The curvilinear lamination stack 708 is a stack of curvilinear lamination portions 702 which are lined up and mounted one on top of each other until a predetermined stack height 710 is reached. The curvilinear lamination portions 702 are attached to each other to form the curvilinear lamination stack 708 using a suitable glue, epoxy, or the like. The predetermined stack height 710 is selected to be greater, or approximately match, the height of the motor units 712, such that the motor units 712 can be inserted into the curvilinear lamination stack 708, as will be described. A lamination stack may be beneficial in reducing eddy currents that can result in energy losses and increased heat in the motor. However, in some embodiments, the track section 700 may be formed using a monolithic motor core made out of a solid ferromagnetic metal like iron, or the like, or a ferromagnetic compound.

Turning to FIGS. 9A and 9B, a perspective view and top view, respectively, of the powered curvilinear track section 700 is shown. The curvilinear lamination stack 708 is shown with pairs of motor units 712 inserted into to the slots 704, except for one motor unit 712 pair which are not shown as inserted into the slots 704 for illustration purposes.

In one embodiment, the pair of motor units 712 comprises two types of motor units 712: an inner motor unit 712a and an outer motor unit 712b. The motor unit 712 includes an armature 716 having a top 718, a bottom 720, a first side 722, and a second side 724. The motor unit 712 also has a central rectangular spacing 726. The spacing 726 may have a width that is slightly larger than the width of a side 722 or 724 of the motor unit 712 in order to allow interleaving of motor units 712 (as will be described); for example, the spacing 726 width may be 25 mm. Along the armature 716 are a plurality of motor coils 714 grouped into windings. The motor coils 714 may be made of, for example, copper, aluminum, or the like. In this example, there are eight windings; however, any suitable amount of windings may be used as long as the windings configuration matches the slot grouping 706 configuration. The windings of the motor coils 714 at the first side 722 and second side 724 may be wound to be approximately straight and vertical. The windings of the motor coils 714 at the first side 722 are approximately parallel with the windings of the motor coils 714 at the second side 724. In a further example, the windings of the motor coils 714 may be etched windings in a multi-layer circuit board. In some instances, a motor coil 714 may refer to a motor unit 712.

The motor coils 714a of the inner motor unit 712a are inserted into the slots 704 of the curvilinear lamination stack 708. The motor coils 714a on each side 722a, or 724a of the inner motor unit 712a are lined up and inserted into an associated slot grouping 706. The inner motor unit 712a is configured such that there is one slot grouping 706 in between the sides 722, 724 of the inner motor unit 712a. The motor coils 714b of the outer motor unit 712b are inserted into the slots 704 of the curvilinear lamination stack 708 in an overlapping relationship with the inner motor unit 712a. Thus, the motor coils 714 of the pair of motor units 712 are interleaved. In order to overlap the motor units 712, the motor coils 714b on one side 722b or 724b of the outer motor unit 712b are lined up and inserted into the slot grouping 706 located between the sides of the inner motor unit 712a. At the same time, the motor coils 714b on the other side 722b or 724b of the outer motor unit 712b are lined up and inserted into the slot grouping 706 located outside one of the sides 722a, 724a of the inner motor unit 712a; in this case, lined up and inserted into the slot grouping 706 to the left of the inner motor unit 712a. Inner motor units 712a and outer motor units 712b are inserted in this way along the length of the powered curvilinear track section 700.

The motor units 712 may be joined to the curvilinear lamination stack 708 using any suitable means known in the art; for example: inserting an insulator prior to insertion of the motor unit 712, inserting the motor unit 712, and then providing an adhesive over the motor unit 712. The adhesive may be, for example, an epoxy potting compound.

The top 718a and bottom 720a of the inner motor unit 712a, and in some cases the top 718b and bottom 720b of the outer motor unit 712b, may be curved in order to have the center of balance of the inner motor unit 712a and the outer motor unit 712b biased towards the curvilinear lamination stack 708. In other cases, only the top 718a and bottom 720a of the inner motor unit 712a may be curved. The top 718a and bottom 720a of the inner motor unit 712a may have a more acute angle than the outer motor unit 712b to ensure that motor coils 714 of both motor units 712 can be fully inserted into the slots 704. As the inner motor units 712a overlap the outer motor units 712b for an interleaved arrangement, only two types of motor units 712 may be required. It is intended that this may provide an advantage over conventional systems which typically require a curved section to have a number of different motor unit shapes to match conventional coil arrangements that fan out or at different angles to each other. Having only two types of motor units 712 is intended to have less complexity, increased flexibility and less cost.

In other embodiments, the truck section may use only one type of motor unit. In this case, motor units may be inserted into slots in a manner such that the motor units are adjacent to each other and are not interleaved but the slot groupings may be cut at predetermined angles to produce results as described herein.

As described, the slots 704 of a slot grouping 706 may be approximately parallel. As such, the approximately vertical motor coils 714 can be inserted straight in without further configuration required. As such, the motor units 712 may be used for both powered curvilinear track sections 700 and powered linear track sections 102. The dual usage of the motor units 712 can increase flexibility of the system and reduce cost and complexity.

As described above, slots 704 may be angled relative to the curved edge of the curvilinear lamination portion 702. This angle may be configured to be appropriate for the inserted motor coil 714 at that particular location of the curvilinear lamination portion 702. The angle is intended to be optimized to the curve profile of the curvilinear lamination portion 702 such that the powered curvilinear track section 700 can have consistent, smooth, efficient and/or powerful control of a moving element 104 while it is traversing the powered curvilinear track section 700.

The embedded coils 714 of the motor units 712 can be individually excited by the coil driver 616 so that an electrically-induced magnetic flux produced by the motor unit 712 is located adjacent to a given moving element 104 to be controlled, in a direction normal thereto, without affecting adjacent moving elements 104. The motive force for translating each moving element 104 arises from the MMF force produced by each moving element 104 and the stator armature 716, i.e., by the tendency of the corresponding magnetic fluxes provided by the stator armature 716 and moving element 104 to align. A zone controller 602 enables separate and independent moving MMFs to be produced along the length of the powered curvilinear track section 700 for each moving element 104 so that each moving element 104 can be individually controlled with a trajectory profile that is generally independent of any other moving element 104. Structurally, like the straight track section 102 described above, the powered curvilinear track section 700 may thus be broadly classified as a moving-magnet type linear brushless motor having multiple moving elements 104.

In conventional linear motor conveyor systems with curved track sections, curved track sections may produce unwanted forces on a moving element traversing the curved track section. The excessive forces may be caused by undesirable rates of change of acceleration, hereinafter called "jerk". The jerk can have unwanted consequences of shifting components being carried by the moving element. The jerk may be especially pronounced at the transition point between the curvilinear track section 700 and straight section 102 of track. In conventional linear motor conveyor systems with curved track sections, a moving element traversing the curved track section may reach a speed where the centrifugal force exceeds the holding force of the permanent magnets and causes the moving element to dislodge from the track.

Further, in conventional linear motor conveyor systems, sudden changes in a magnet gap, such as the transition point between two track sections, can result in "magnetic bumps" to a moving element. Conventional conveyor systems typically have difficulty maintaining smooth motion across regions with magnetic bumps, which may undesirably bump and shift components being transported by the moving element. Conventional conveyor systems may also have difficultly stopping and holding a moving element in the region of a magnetic bump. Further, when the conveyor system is powered off and closed loop control stops, a moving element straddling a magnet bump could have undesired movement due to residual magnetic forces from the permanent magnets of the conventional conveyor system.

It is an intended advantage of the present disclosure to have a track profile for a curvilinear section of track that minimizes jerk and allows high speeds through the curve without the centrifugal force becoming problematic. It is also an intended advantage to minimize the impact of magnetic gap changes that may occur as the moving element 104 traverses curvilinear sections of track 1000. It is a further intended advantage to minimize the impact of magnetic gap changes at the transition areas between straight and curvilinear sections of track.

Figure 10A:
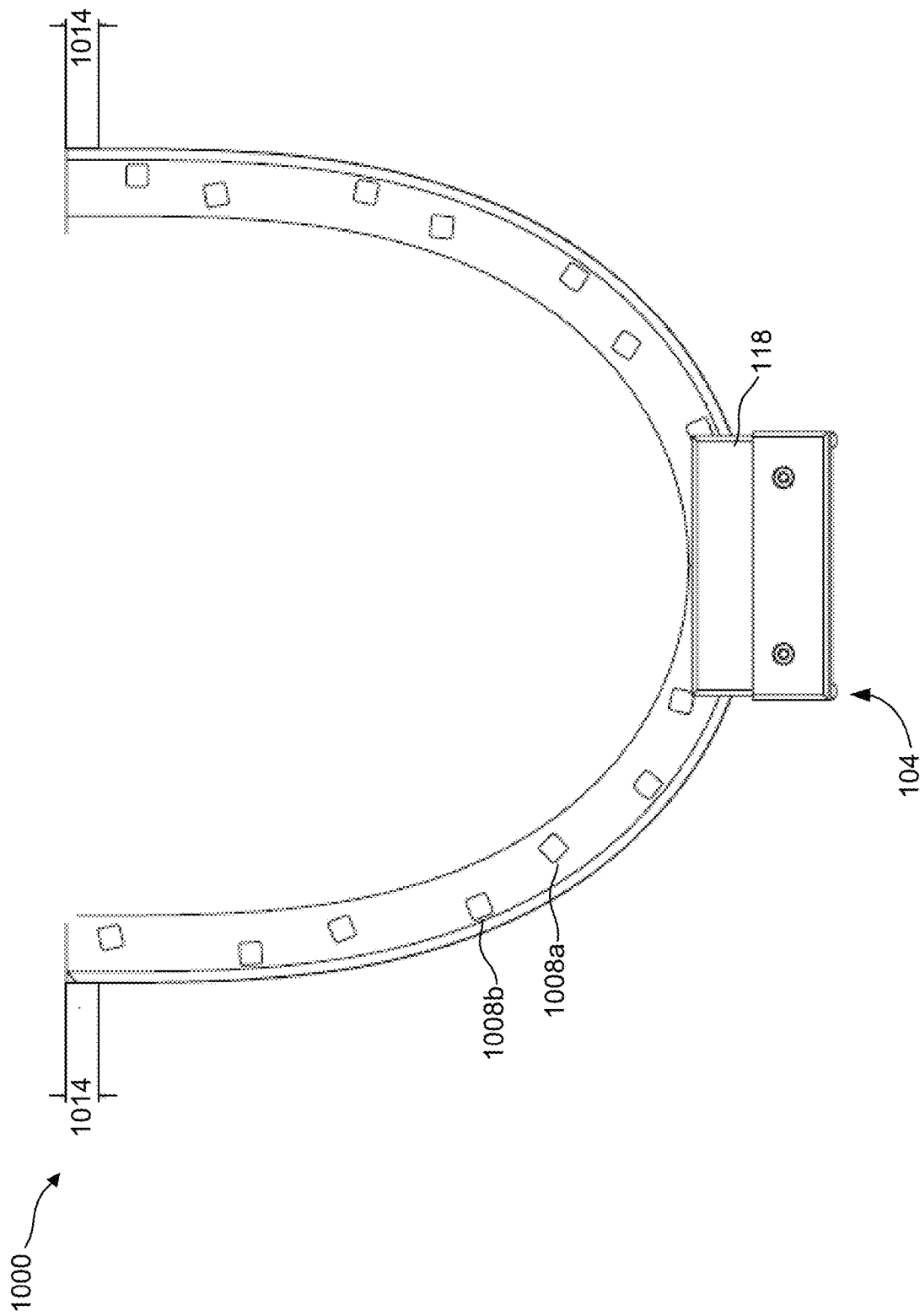
FIG. 10A is a top view of a curvilinear track section with sensors, according to an embodiment.

As shown in the embodiment of FIGS. 10A and 10B, a curvilinear track section 1000 may be configured with a profile of curvature intended to minimize jerk on the moving element 104 as it traverses through the curvilinear track section 1000. In some cases, the jerk may also be minimized when the moving element 104 transitions from straight track sections (not shown) to the curvilinear track sections 1000, and from the curvilinear track sections 1000 back to the straight sections.

In some embodiments, the physical track profile may be configured such that the moving element 104 will have a rate of change of angular velocity which is sinusoidal over the span of the curvilinear track section 1000. FIG. 10A illustrates an example of a top view of a curvilinear track 1000 with a sinusoidal angular velocity track profile. With a sinusoidal angular velocity track profile, a moving element 104 travelling at constant velocity would travel through the 180 degree curvilinear track section 1000 with a sinusoidal rate of change of angular velocity.

To minimize unwanted forces, any change in direction of travel of the moving element 104, that is, its angular velocity, should be gradual. As well, any change in the magnetic coupling between the curvilinear track section 1000 and the moving element 104 should be gradual to minimize unwanted forces, such as "magnetic bumps". A sinusoidal angular velocity track profile has been found to minimize unwanted forces, such as those caused by jerk and magnetic bump, as the moving element 104 traverses the curvilinear track section 1000.

A sinusoidal angular velocity track profile may be configured to handle a moving element 104 going from an angular velocity of approximately zero at the entry to the curvilinear track section 1000, up to a peak value of angular velocity at the apex of the curvilinear track section 1000, and back down to approximately zero as moving element 104 exits the curvilinear track section 1000. Transitioning this from an initial value of approximately zero to some peak value and then back to approximately zero in a sinusoidal fashion, in some cases akin to simple harmonic motion, is intended to minimize the above unwanted forces.

Further, the sinusoidal angular velocity track profile may also allow moving elements to traverse the curvilinear track section at relatively high speeds, and carrying relatively heavy components, without exceeding the holding force of the magnets of the moving element 104 and causing the moving element 104 to dislodge from the curvilinear track section 1000. In the example of FIG. 10, the sinusoidal angular velocity track profile is applied to a 180° curvilinear track section; however, the sinusoidal angular velocity track profile may be applied to any curvature of track, for example, 30°, 45°, 90°, or the like. The sinusoidal angular velocity track profile may also be applied to inside (concave) curves, curves in three-dimensions, or the like.

In some cases, to further minimize unwanted forces, such as those caused by jerk, a transition curve may be used to join a straight track section to a curvilinear track sections such as, for example, a track section of constant radius. A transition curve may also be used to join a curvilinear track section to a straight track section.

FIG. 11 illustrates a top view of a curvilinear track section 1000 with a transition curve. In this case, the curvilinear track section 1000 has a clothoid profile region 1010 at or near the ends of the curvilinear track section 1000. The curvilinear track section 1000 also has a constant curvilinear region 1012 with a constant radius between the clothoid profile regions 1010. In still other cases, the constant curvilinear region 1012 may have another appropriate profile, including a clothoid profile. In some cases, the curvilinear track section 1000 may include a linear portion 1014 at the ends of the curvilinear track section 1000, as will be described. The example of FIG. 11 illustrates a curvilinear track section 1000 with a 180° curve; however any suitable curve angle for example, 30°, 45°, 90°, or the like, may be used. In this example, the constant curvilinear region 1012 has an angle of approximately 147° and the clothoid transition regions 1010 on both sides of the constant curvilinear region 1012 has an angle of approximately 16.5°. The three regions thus add up to 180°, the total angle of the curvilinear track section 1000. The size of the clothoid transition regions 1010 is configurable and the two transition regions do not necessarily have to be the same length or angle. The clothoid transition regions 1010 may be applied to any curvature of track, for example, 30°, 45°, 90°, or the like. The clothoid transition regions 1010 may also be applied to inside (concave) curves, curves in three-dimensions, or the like.

A curvilinear track section 1000 with clothoid transition regions 1010 may also reduce jerk on a moving element 104 as it travels through the region of the curvilinear track section 1000 where there is a constant curvilinear region 1012. As well, it is an intended advantage that a conveyor station can work on components carried by a moving element 104 without undue constraint if the moving element 104 is in a region of constant radius 1012.

In some cases, the curvilinear track section 1000 may have a linear portion 1014 in the region where the clothoid transition regions 1010 joins with a straight track section (not shown). The linear portion 1014 is intended to ease the transition into the curve and accommodate proper guide rail alignment on entering the curve.

In other cases, a wider turn may be desirable. In this case, a small straight track section may be included generally at the apex of the turn. The small straight section may be useful to, for example, provide or allow for teach points and make programmable adjustments at a station along a straight line or for other purposes.

As a linear motor conveyor may comprise separate track sections or modules, adjacent track sections may need to be accurately aligned such that moving elements can travel smoothly across track section boundaries. Alignment procedures are generally known in the art and may include the use of, for example, gauges, dial indicators, rulers, or the like. When a straight track section is joined with a curvilinear track section 1000, alignment may be difficult if the curvature of the curvilinear track section 1000 starts immediately. This difficulty may be due to, for example, the difficultly encountered when attempting to use gauges, dial indicators and the like on a curvilinear track. Thus, a linear portion 1014 prior to curvilinear regions of the curvilinear track section 1000 may allow for proper and easy alignment of the curvilinear track section 1000 with other track sections. In the example of FIG. 11, the curvilinear track section 1000 has an 18 mm linear portion 1014 on both ends of the curvilinear track section 1000; however, any suitable length may be used for the linear portion 1014. This relatively small linear portion 1014 accommodates alignment of the guide rails, as aligning two straight guide rails may be more straightforward than attempting to align one straight guide rail and one curved guide rail. The linear portion 1014 may be fabricated into the lamination stack.

As a linear motor conveyor system 100 may comprise separate track sections or modules, adjacent track sections may need to be accurately aligned such that moving elements 104 can travel smoothly across track section boundaries. If the surfaces of the track sections are not accurately aligned at the section boundaries, the bearings 128, 130 of the moving element 104 may not have a smooth transition when travelling across these boundaries. A misaligned transition may cause wear, vibration, audible noise, or the like. In an example, a linear motor conveyor system 100 having the track sections 102 illustrated in FIG. 1 may require accurately aligning the first guide rail 107 within approximately +/−20 microns for smooth, precise motion across track section 102 joints.

Conventionally, problems may occur when attempting to accurately align the rails (or riding surfaces) of the adjacent track sections due to machining stack up tolerances. Multiple stack up tolerances may be present in each track section that may influence the location of the surfaces of the track section. Once guide rails or surfaces of two adjacent track sections are accurately aligned using procedures known in the art, the track sections need to be structurally bound together to withstand the forces applied to the track sections. Conventional conveyor systems may have difficulties structurally binding two adjacent sections together, while maintaining accurate alignment of the surfaces of the track sections. Conventional conveyor systems typically require expensive and/or complex mechanisms.

Turning to FIGS. 12A and 12B, a top view of two adjacent straight track sections 102 joined using a wedge aligner 1200, according to an embodiment, is shown. The wedge aligner 1200 includes a casing 1202, a fixed mount 1204, a wedge 1206, an adjuster 1208 and fasteners 1210. The fixed mount 1204 may be rigidly attached to one of the adjacent track sections 102, the right track section 102 in the example of FIG. 12, using the fasteners 1210. The fixed mount 1204 is flexibly attached to the other adjacent track section 102 using the fasteners 1210. A wedge 1206 is positioned intermediate the fixed mount 1200 and the other adjacent track section 102. In the example of FIG. 12, the wedge 1206 is a 7° inclined plane; however, any suitable angle or shape may be used.

The wedge 1206 may be translated back and forth along the longitudinal axis of the straight track sections 102 using the adjuster 1208. In the example of FIG. 12, the adjuster 1208 is an adjustable screw; however, any suitable mechanism for translating the wedge 1206 back and forth is contemplated. The wedge 1206 may define holes through its face (not shown) for permitting passageway of the fastener 1210. The holes may be shaped such that translation of the wedge 1206 back and forth does not result in the sides of the holes abutting the fastener 1210.

In order to align the two adjacent track sections 102, the guide rails 107, 109 may be accurately aligned with procedures known in the art. The wedge 1206 may then be inserted between the fixed mount 1204 and the track section 102 to compensate for stack up tolerances. The wedge 1206 is adjusted using the adjuster 1208 to ensure the wedge 1206 is firmly in place. The fasteners 1210 may then be tightened to rigidly bind the two adjacent track sections 102 together. Even after tightening, the wedge 1206 stays in place to compensate for machining tolerances. When the wedge aligner 1200 is tightened, the guide rails 107, 109 will maintain an accurate alignment due to the fact the wedge 1206 has been firmly inserted to compensate for the stack up tolerances. In further cases, the adjuster 1208 may also be used as an adjustment tool for fine alignment of the surfaces of the track sections 102. In an example, the adjuster 1208 may provide fine adjustment of approximately +/−20 microns prior to tightening of the fasteners 1210 in the final, accurately aligned location. In some cases, the wedge aligner 1200 has a casing 1202 around at least a portion of the exterior of the wedge aligner 1200 in order to protect the components of the wedge aligner 1200. Precise adjustments for alignment may be particularly important where there are shaped guide rails on the track sections.

FIGS. 13A and 13B illustrate a top view of a wedge aligner 1300 according to another embodiment. In the embodiment of FIG. 13, the wedge aligner 1300 joins a straight track section 102 and a curvilinear track section 1000. In this embodiment, the wedge aligner 1300 also includes a casing 1302, a fixed mount 1304, a wedge 1306, an adjuster 1308 and fasteners 1310. In this embodiment, the fixed mount 1304 may have an angle to both rigidly attach to one of the track section, in this case the curvilinear track section 1000, and flexibly attach to the other track section, in this case the straight track section 102. In the example of FIG. 13, the flexible mount 1304 has an angle of approximately 90°; however, any suitable angle may be used to attach to the adjacent track sections. Otherwise, the wedge aligner 1300 operates in the same manner as the wedge aligner 1200 in the embodiment of FIG. 12.

Conventional linear motor conveyors with curved track sections typically encounter problems where wheels or bearings on a moving element roll differently on the curved section of track than they do on a straight section of track. In some conventional conveyor systems, the wheels or bearings may skid on the curved section of track, which may result in wear and/or require expensive anti-skid or wear resistant materials. In some other conventional conveyor systems, further mechanical elements may be required in order to have moving elements operate on both straight and curved sections of track. Further, conveyor system performance may be constrained (i.e. speed, acceleration or the like) on the curved sections of track if the wheels or bearings of the moving element have to operate differently on the curved sections of track.

Turning again to FIGS. 10A and 10B, the curvilinear track section 1000 and the bearings 128, 130 of the moving element 104 may be configured to reduce wear and deterioration of the bearings 128, 130. Similar to the straight track section 102, the curvilinear track section 1000 may include two guide rails: a first guide rail 1002 which may be located on the top of the exterior side of the curvilinear track section 1000; and a second guide rail 1004 which may be located on the bottom of the exterior side of the curvilinear track section 1000. Both the first guide rail 1002 and the second guide rail 1004 may be located to the top of and to the bottom of, respectively, the motor units 1006. In some cases, the first guide rail 1004 may have a "V" or "U" shaped profile to support and guide the moving element 104, and the second guide rail 1004 may be a smooth surface with a flat profile. The vertex of the first guide rail 1002 and the surface of the second guide rail 1004 are approximately aligned to be co-planar. As well, the vertex of the first guide rail 1002 and the surface of the second guide rail 1004 are configured to have approximately the same profile of curvature.

The moving element 104, illustrated in FIGS. 4A and 4B, includes bearings 128, 130 that have approximately the same radius; whereby the radius for the first set of bearings 128 is measured from the shaft of the bearings 128 to the portion of the bearings 128 that abuts the surface of the second guide rail 1004; and the radius of the second set of bearings 130 is measured from the shaft of the bearings 130 to the portion of the bearings 130 that abuts the vertex of the first guide rail 1002. The space between the shafts of the first set of bearings 128 and the space between shafts of the second set of bearings 130 may be approximately equal.

As the moving element 104 travels along the side of both linear and curvilinear track sections, the bearing 128 or 130 configuration of the moving element 104 in conjunction with the guide rail 1002, 1004 configuration of the curvilinear track section 1000 is intended to allow the bearings 128, 130 to maintain approximately full contact with the guide rails 1002, 1004 throughout the moving element's 104 traversal of the curvilinear track section 1000. As all the bearings 128, 130 of the moving element 104 are approximately in the same contact with the guide rails 1002, 1004, a horizontal shelf 117 attached to the moving element 104 can stay approximately level as the moving element 104 traverses the curvilinear track section 1000. Further, the bearings 128, 130 of the moving element 104 rotate and maintain contact in the same manner on the curvilinear track section 1000 as the bearings 128, 130 do on the straight track sections 102, allowing a smooth transition and consistency as the moving element transitions from straight track section 102 to curvilinear track sections 1000. Conventional linear motor conveyor systems typically have some bearings/wheels on a moving element travel farther than other bearings/wheels of the moving element while the moving element is traversing a curved section. In contrast, the current embodiments may have diminished skidding, wear or the like on the bearings 128, 130. As such, the bearings 128, 130 may last longer and/or can be made of less expensive materials.

As shown in the embodiment of FIGS. 10A and 10B, a curvilinear track section 1000, like the straight track sections 102, may have sensors 1008 positioned along the top surface of the curvilinear track section 1000. The sensors 1008 may be offset such that there are inner sensors 1008a and outer sensors 1008b. It is an intended advantage that the same sensors 1008, 122, 123 can be used for both the curvilinear track sections 1000 and the straight track sections 102; allowing sensors 1008, 122, 123 to read the same machine readable medium 120 mounted on the extension 118 of the moving elements 104. It is also an intended advantage that a high-resolution machine readable medium 120 may be used on the curvilinear track sections 1000 with approximately similar performance (for example, resolution and speed) as on the straight track sections 102. Further, it is an intended advantage that a machine readable medium 120, in the form of a linear strip, can be used on both the curvilinear track sections 1000 and the straight track sections 102.

The sensors 1008 are positioned on the curvilinear track section 1000 such that the sensors 1008 are oriented perpendicular to the direction of motion. In this orientation, a linear strip machine readable medium 120 can be used on both straight sections of track 102 and curvilinear sections of track 1000. The linear strip machine readable medium 120 will change angle as the moving element 104 traverses the curvilinear track section 1000. The sensors 1008 are configured to handle this angular variation and are able to provide useable position information. In other cases, the sensors 1008 may have a design that is sufficiently tolerant of the angular variation. The linear strip machine readable medium 120 may be configured to have a width that passes over the sensors at all points in the curvilinear track section 1000, and as such, the system may be able to receive valid position readings from the sensors 1008 at any position on the curvilinear track section 1000.

FIG. 10A illustrates the variable spacing of the sensors 1008 with a moving element 104 on the curvilinear track section 1000. The variable spacing of the sensors 1008 are positioned such that there is sensor adequate for engagement with the linear strip machine readable medium 120 as the moving element 104 traverses the curvilinear track section 1000. The length and width of the extension 118, in conjunction with the positioning of the sensors 1008, may be configured such that the extension 118 overlaps at least two sensors 1008 at any given time. This configuration may allow adequate sensor engagement with the linear strip machine readable medium 120 at any given time. In other cases, the length and width of the extension 118, in conjunction with the positioning of the sensors 1008, may be configured such that there is adequate overlap of two sensors 1008 for handoff from one sensor 1008 to the other sensor 1008.

Straight track sections 102 may have a common linear frame of reference to use for calibration. In an example, if two sensors 1008 are expected to be 62.500 mm apart but the actual data received expresses that they are 62.550 mm apart, the system may apply a calibration offset of 0.050 mm to compensate for actual system tolerances. However, this calibration procedure may not hold true for curvilinear track sections because the raw data from any two sensors 1008 are not in the same linear frame of reference. Particularly, the calibration data may be off due to: the depth of the curvilinear track section 1000, the sensors 1008 being on a different curve angle than the path of the moving element 104 which follows the guide rails 1002, 1004; the linear strip machine readable medium 120 on the moving element 104 may change angle as the moving element 104 traverses the curvilinear track section 1000, which may give non-linear readings; and/or certain manufacturing tolerances may occur in two dimensions.

For curved track section, in some cases, it may be a problem to calibrate one of the sensors to a known absolute zero, which may be used as a reference to calibrate the other sensors. Accordingly, the first sensor 1008 on the curvilinear track section 1000 may be calibrated to the last sensor 122 or 123 on the straight track section 102; as the sensors 122 or 123 on the straight track section 102 have a known absolute value once calibrated. If the curvilinear track section 1000 has a linear portion 1014, the first sensor 1008 in the curvilinear regions 1010, 1012 can be calibrated to the last sensor in the linear portion 1014 as the sensors 1008 in the linear portion 1014 have a known linear frame of reference.

In an example, when a moving element 104 traverses the curvilinear track section 1000, the linear strip machine readable medium 120 may be configured to have a length such that there is always an overlap region when handing off from one sensor 1008 to the next sensor 1008. While the linear strip machine readable medium 120 is in this overlap region, a common variable is the velocity of the moving element 104, which may be determined by the rate of change of the sensor 1008 readings. As well, while the linear strip machine readable medium 120 is in this overlap region, the zone controller 200 is getting readings from two sensors 1008 from the same moving element 104 at the same time. The moving element 104 velocity from these two readings must necessarily be the same as both readings measure the same physical moving element 104. As such, an estimate may be made of the true velocity of the moving element 104. The true velocity measurement may then be used to build a correlation between actual moving element 104 travel versus what is being reported by the sensors. In an example, if one calibrated sensor, such as a sensor 122 or 123 from the linear track section 102, indicates the moving element 104 is moving at 0.200 m/sec, a predetermined position table may be used for the second sensor 1008, from the curvilinear track section 1000, such that the readings coming from the second sensor 1008 are adjusted to match the 0.200 m/sec. Sensor 1008 calibration, based on matching velocity, can then be performed on each sensor 1008 around the curvilinear track section 1000.

Any sensor 1008 will typically read reasonably "true" when the moving element 104 is nearly centered on the sensor 1008, because, at this point, the machine readable medium's 120 angle of travel is nearly aligned to the sensor 1008. This fact may be useful when analyzing the output of multiple sensors, to produce a reasonable estimate of position and/or velocity. Velocity may be used because, although the designed locations of the sensors 1008 may be known, the actual physical location of the sensors 1008 may not be precisely known due to manufacturing tolerances, which has the possibility of introducing errors. The sensors 1008 are used to estimate the velocity of the moving element 104.

There may also be two mechanisms for reducing noise in the measurements of velocity: attaching some mass to the moving element 104, which may give the moving element 104 some physical inertia and which may help the moving element 104 retain a constant velocity; and applying an optimized digital filter to the measured values.

The position table may be used to "linearize" the output from sensors 1008 on a curvilinear section of track 1000. A position table may be defined for each sensor 1008. Each position table may consist of an ordered set of value pairs (r, p), where "r" is the reading provided by the sensor, and "p" is the moving element's 104 actual position along the rail, relative to the location of the sensor 1008. The range of values in each table is defined such that it covers the entire usable range of travel, in which the machine readable medium 120 can be read by the sensor 1008. The moving element's 104 position along the guide rail 1002 or 1004 of the curvilinear track section 1000, relative to the sensor 1008, can be calculated by simple interpolation within the position table. The moving element's 104 absolute position on the curvilinear track section 1000 may then be determined by adding the calibrated location of the sensor 1008.

As the curvilinear track section 1000 may not have a common linear frame of reference, the sensors 1008 may be on a different curve angle than the guide rails. As such, the linear strip machine readable medium 120 on the moving element 104 may change angles as the moving element 104 traverses the curvilinear track section 1000; which may give non-linear readings and certain manufacturing tolerances may occur in two dimensions. Accordingly, the raw encoder values may be resolved to linear units of measure, such as, for example, linear microns.

The sensors 1008 produce a value that indicates a distance along the machine readable medium 120. Due to the curvature of the curvilinear track section 1000, the translation between the distance read by the sensor 1008 and the "distance along the rail" traversed by the moving element 104 is non-trivial. The values in the position tables are used to resolve the position of the moving element 104 by performing a position table lookup followed by linear interpolation between two adjacent points in the table.

In some cases, the position table may be used to translate a series of zone boundaries on a linear strip machine readable medium 120 to a corresponding linear distance along the curvilinear track section 1000. A linear approximation may then be made to the raw data received while the linear strip machine readable medium 120 is within the zone boundary. The approximation may then be translated, via the position table, to linear measurements of the moving element 104 along the curvilinear track section 1000.

In a particular example, a linear strip machine readable medium 120 may be divided into a number of zones. The zones may be 4 mm wide, and with a 144 mm linear strip machine readable medium 120, there may be up to 36 zones. In some cases, there may be less usable zones for tighter portions of the curvilinear track section 1000. A theoretical position table is generated for each of the 4 mm zone boundaries; in this example, there are 36 numbers in the position table. The position table translates the 36 zone boundaries to a corresponding linear measurement in microns. In this example, the values in the position table define how far the center of the moving element 104 would have travelled along the surface of the second guide rail 1004 on the curvilinear track section 1000. As such, the position table translates 4 mm zone crossings to distance travelled along the curve in microns. In some cases, the theoretical position table may be generated virtually, for example, using 3D CAD simulation software. In the simulation, a moving element 104 may be placed at the area where the linear strip machine readable medium 120 is approximately on a boundary of a given 4 mm zone within the linear strip machine readable medium 120. A determination is then made regarding how far the center of the moving element 104 has to travel along the surface of the second guide rail 1004. A value representing this linear position of the pallet on the curvilinear track section 1000 can be approximated. Any suitable approximation may be used; for example, a linear approximation, a best fit curve, more densely spaced data points, or the like. This measurement may be repeated for each of the 36 zone boundaries for each sensor. With all the measurements, a theoretical position table may be generated for each sensor on the curvilinear track section 1000. In a further case, the virtual simulation may be conducted as a physical experiment. As the position table may be theoretical, there may be tolerance variation with the actual curvilinear track section 1000. The above calibration procedure, based on matching velocity, can then be used to provide more accurate approximation for the values in the position table. After which the zone boundaries may be accurately translated to distance travelled along the curve.

It is an intended advantage that the moving element 104 positions are consistent on both straight sections of track 102 and curvilinear sections of track 1000. In an example, if a curvilinear section 1000 and a straight section 102 are both 1000.000 mm long, the resolved position of a moving element 104 along either type of track section may appear the same for teaching, programming and configuration of the linear motor conveyor system 100. The non-linear position information is resolved from the sensors 1008 on the curvilinear sections of track 1000 to the center of the moving element 104 along the second guide rail 1004 (or the vertex of the first guide rail 1002). As center of the moving element 104 is used to resolve position information on the straight sections 102 of track, resolving it to this area may allow the positions to be consistent for both straight sections of track 102 and curvilinear sections of track 1000. In other cases, the position information may be resolved from the sensors 1008 on the curvilinear sections of track 1000 to the center of the moving element 104 along the face of the motor unit 712. Any appropriate reference frame on the moving element may be used; for example, the left or right side of the moving element, or the like. Further, any appropriate reference frame along the curvilinear track section 1000 may be used; for example, the vertex or base of the first guide rail 1002, the face of the motor unit 714, or the like. The points of reference for the readings and measurements may be adjusted as needed.

The curvilinear track section 1000 may have an additional gain or 'boost' applied to the output of the control loop to either increase or decrease coil currents; such as for adapting to variations in magnetic coupling through the curvilinear track section 1000. In a certain case, an increase in magnetic gap may form as the moving element 104 traverses through the curvilinear track section 1000. The magnetic gap may be the distance between the magnets of the moving element 104 and the curvilinear track section 1000. The magnetic gap may increase as the moving element 104 traverses through the curvilinear track section 1000 until the magnetic gap may be at its greatest at the apex of the curve. Correspondingly, the magnetic coupling of the moving element 104 to the curvilinear lamination stack 708 may be at the lowest level at the apex of the curvilinear track section 1000. The magnetic gap is generally related to the radius of the curvilinear track section 100. For a curvature with continuously varying radius, the magnetic gap may also vary continuously. Due to the magnetic gap increase, a boost in current to the motor coil 714, resulting in more thrust on the moving element 104, may be applied as the moving element 104 approaches and traverses through the apex of the curvilinear track section 1000. In some cases, the boost may be a trapezoidal boost that may start at a scale factor of unity gain as the moving element 104 enters the curvilinear track section 1000. The boost may increase as the moving element 104 traverses the curvilinear track section 1000 such that the boost may reach a scale factor of approximately two when the moving element 104 reaches the apex of the curvilinear track section 1000. The boost may then decrease such that the boost again reaches a scale factor of unity gain as the moving element 104 leaves the curvilinear track section 1000. Any suitable scale factors for the boost may be used such that the magnetic gap between the moving element 104 and the lamination stack is suitably reduced.

Figure 14:
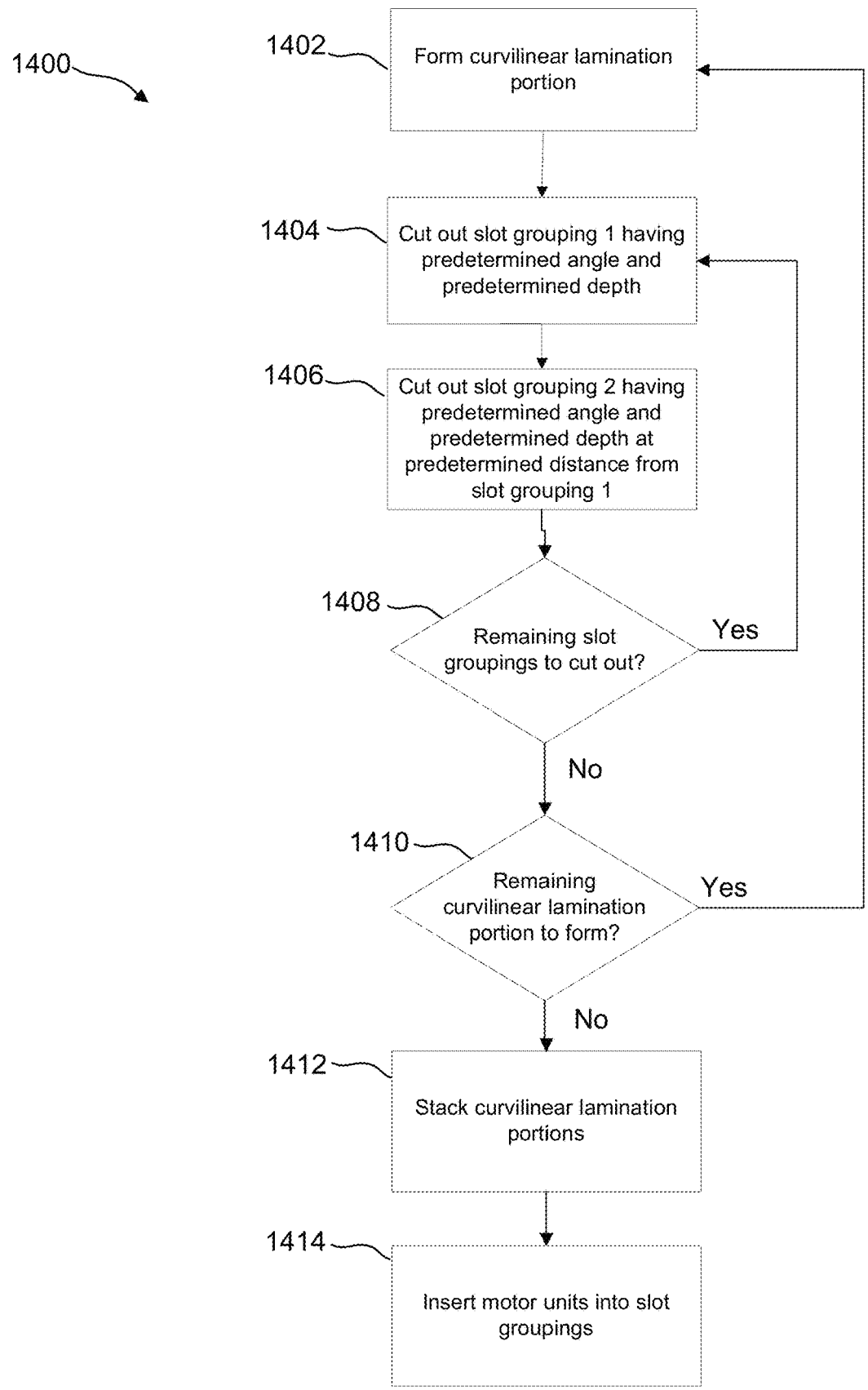
FIG. 14 illustrates a flowchart for a method of manufacturing a powered curvilinear track section, according to an embodiment.

FIG. 14 illustrates a flowchart for a method 1400 of manufacturing a powered curvilinear track section 700, according to an embodiment. At 1402, a curvilinear lamination portion 702 is formed into a suitable shape. In the example of FIG. 7, the curvilinear lamination portion 702 has a 'U' shape such that it forms an 180° turn. In some cases, the curvilinear lamination portion 702 may be formed out of multiple pieces of lamination. In further cases, the shape of the curvilinear lamination portion 702 may have a sinusoidal angular velocity track profile. In other cases, the shape of the curvilinear lamination portion 702 may have at least one region with clothoid profile 1010 and a region with constant radius 1012. In yet other cases, the curvilinear lamination portion 702 may have a linear portion 1014 at the ends of the curvilinear lamination portion 702. In this case, the curvilinear lamination portion 702 has a 180° turn; however, the turn may be, for example, 45°, 90°, or the like. The shape of the curvilinear lamination portion 702 can also form inside (concave) curves, curves in three-dimensions, or the like.

At 1404, slot grouping 1 706a is cut out of the exterior edge of the curvilinear lamination portion 702. The slots may be cut out using a suitable means; for example, stamped, laser cut, water jet cut or the like. In the example of FIG. 7, a slot grouping 706 consists of eight slots 704; however, a slot grouping can consist of any suitable number of slots. The slots 704 have a predetermined angle relative to the exterior edge of the curvilinear lamination portion 702. All the slots 704 of a slot grouping 706 share the same angle. Each slot 704 in the slot grouping 1 706a may have a different depth. The depth will depend on the angle of the slot relative to the exterior edge of the curvilinear lamination portion 702 as the slots 704 need to have sufficient depth such that the motor unit 712 can be partially or fully inserted into the slots 704. In an example, the depths of the slots 704 can be determined by: cutting the depths of the farthest-left slot 704 on the slot grouping 1 706a and the farthest-right slot on the slot grouping 2 706b the same depth as would be cut for a straight section 102 of track; and the slots 704 in between the farthest-left and farthest-right slots 704 are cut deeper to allow the motor unit 712 to be inserted straight, where the innermost slots 704 may be cut with the deepest depth due to the curvilinear profile of the track section 700.

At 1406, slot grouping 2 706b is cut out of the exterior edge of the curvilinear lamination portion 702. The slots 704 of slot grouping 2 706b share the same predetermined angle relative to the exterior edge of the curvilinear lamination portion 702 as slot grouping 1 706a. Similarly, each slot 704 in the slot grouping 2 706b may have a different depth. Slot grouping 2 706b may be spaced apart from slot grouping 1 706a by a predetermined spacing. The predetermined spacing may be a sufficient distance to allow a further slot grouping 706 to be cut out in between slot grouping 1 706a and slot grouping 2 706b. This may permit motor units 712 to be interleaved.

In some cases, the slot groupings may be formed at different predetermined angles and the motor units may be inserted into the slot groupings in either an interleaved or individually separated and adjacent manner. In other cases, the slot groupings may be adjacent and may be configured to receive separated or interleaved motor units.

At 1408, a determination is made as to whether there are remaining slot groupings 706 to be cut out of the exterior edge of the curvilinear lamination portion 702. In a particular case, there are remaining slot groupings 706 to be cut out if there are regions of the exterior edge of the curvilinear lamination portion 702 without slots 704 cut out.

If there are remaining slot groupings 706 to be cut out, a new slot grouping 1 706a is cut out at 1404. In a particular case, the new slot grouping 1 706a may be located in between the previously cut out slot grouping 1 706a and slot grouping 2 706b. Then at 1406, a new slot grouping 2 706b is cut out to the side of either the previously cut out slot grouping 1 706a or previously cut out slot grouping 2 706b.

If there are no remaining slot groupings 706 to be cut out, at 1410, a determination is made as to whether there are remaining curvilinear lamination portions 702 to be formed. In a particular case, there are remaining curvilinear lamination portions 702 to be formed if the total height of the already formed curvilinear lamination portions 702 is a predetermined height. In some cases, the predetermined height may be equivalent or greater to the height of the motor unit 712.

If there are remaining curvilinear lamination portions 702 to be formed, a curvilinear lamination portion 702 is formed at 1402. The new curvilinear lamination portion 702 will have approximately the same shape and the same slot groupings cut out as the previously formed curvilinear lamination portion 702.

If there are no remaining curvilinear lamination portions 702 to be formed, at 1412, the curvilinear lamination portions 702 are stacked into a curvilinear lamination stack 708. The curvilinear lamination portions 702 are attached to each other to form the curvilinear lamination stack 708 using a suitable glue, epoxy, or the like.

At 1414, the motor units 712 are inserted straight into the slot groupings 706 such that sides of the motor unit 712 are inserted into a slot grouping 706 pair (slot grouping 1 706a and slot grouping 2 706b).

Figure 15:
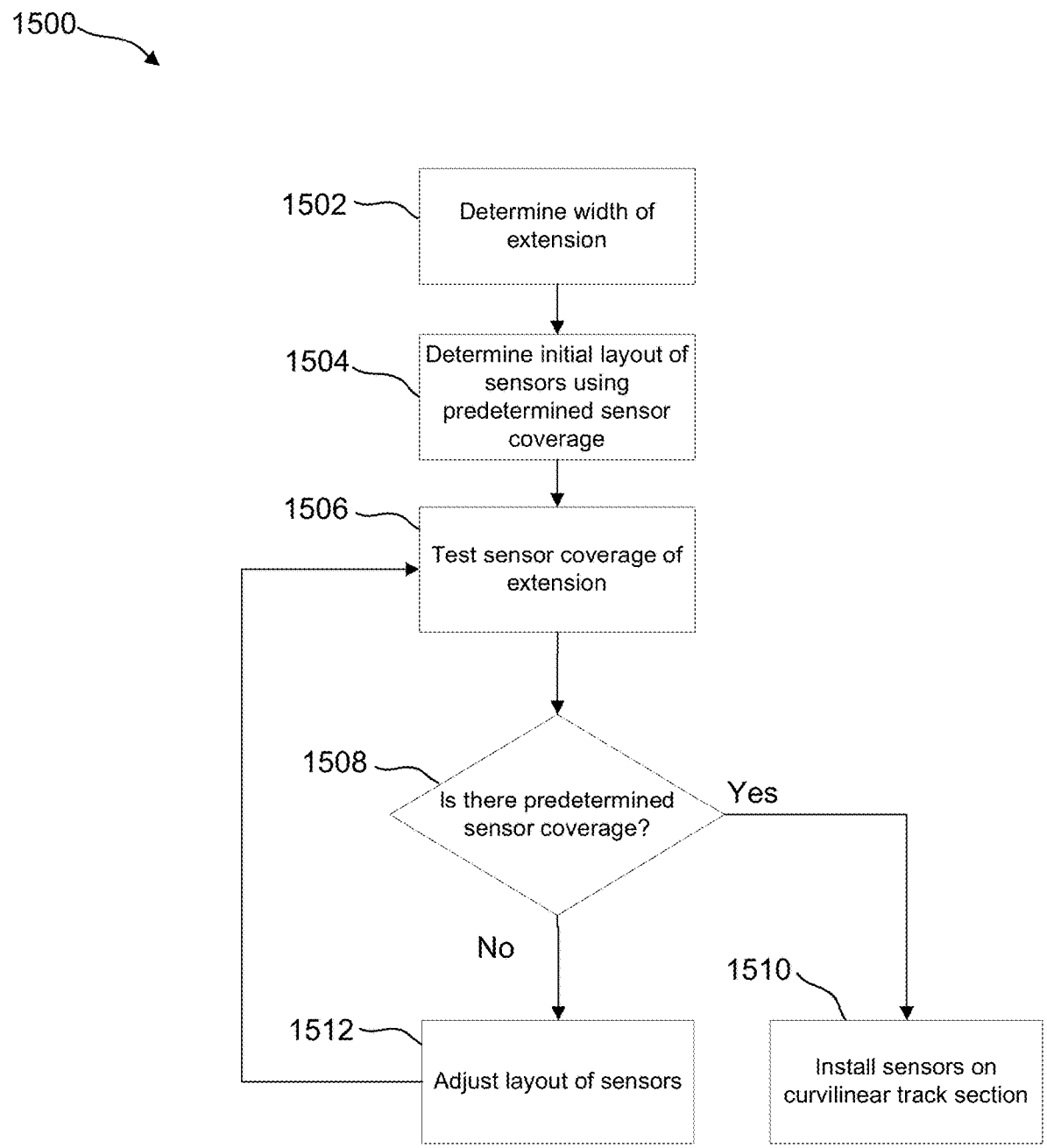
FIG. 15 illustrates a flowchart for a method of laying out sensors on a curvilinear track section, according to an embodiment.

FIG. 15 illustrates a flowchart for a method 1500 of laying out sensors on a curvilinear track section, according to an embodiment. At 1502, the length and width of the extension 118 of the moving element 104 is determined. In some cases, the extension 118 may be approximately the same width as the moving element 104.

At 1504, a determination is made as to the initial layout of the sensors 1008 on the curvilinear track section 1000 using the width of the extension 118 as a guide. The extension 118 may have a predetermined sensor coverage over the sensors as the moving element 104 traverses the curvilinear track section 1000. In a particular case, the predetermined sensor coverage is such that the extension 118 covers at least two sensors 1008 at a given time. In this case, the spacing between two sensors should be less than the length of the extension 118. In some cases, there may be two rows of offset sensors 1008, an inner row of sensors 1008a and an outer row of sensors 1008b. In these cases, the extension 118 may cover two sensors 1008 from both rows at a given time. In other cases, the predetermined sensor coverage may be configured such that there is adequate overlap of two sensors 1008 for handoff from one sensor 1008 to the other sensor 1008.

At 1506, the initial layout is tested by passing an extension 118 over the sensors 1008 positioned in the initial sensor layout. At 1508, a determination is made as to whether the test met the predetermined sensor coverage; such as whether the extension 118 covered at least two sensors 1008 at appropriate timings for the duration of the moving element's 104 traversal of the curvilinear track section 1000. In some cases, the testing may be accomplished virtually, for example, with a 3D CAD simulation.

At 1510, if the test met the predetermined sensor coverage, the sensors 1008 are installed on the curvilinear track section 1000. At 1512, if the test did not meet the predetermined sensor coverage, the layout of the sensors 1008 is adjusted. In an example, if at one point in the track the extension 118 only covered one sensor 1008, the sensor 1008 spacing is shortened to ensure dual sensor 1008 coverage of the extension 118. The rest of the sensors 1008 may also be shifted accordingly. Sensors 1008 may also be added or removed as required. Then, at 1506, the new sensor 1008 layout is tested. In other cases, the predetermined sensor coverage may be configured such that there is adequate overlap of two sensors 1008 for handoff from one sensor 1008 to the other sensor 1008.

Figure 16:
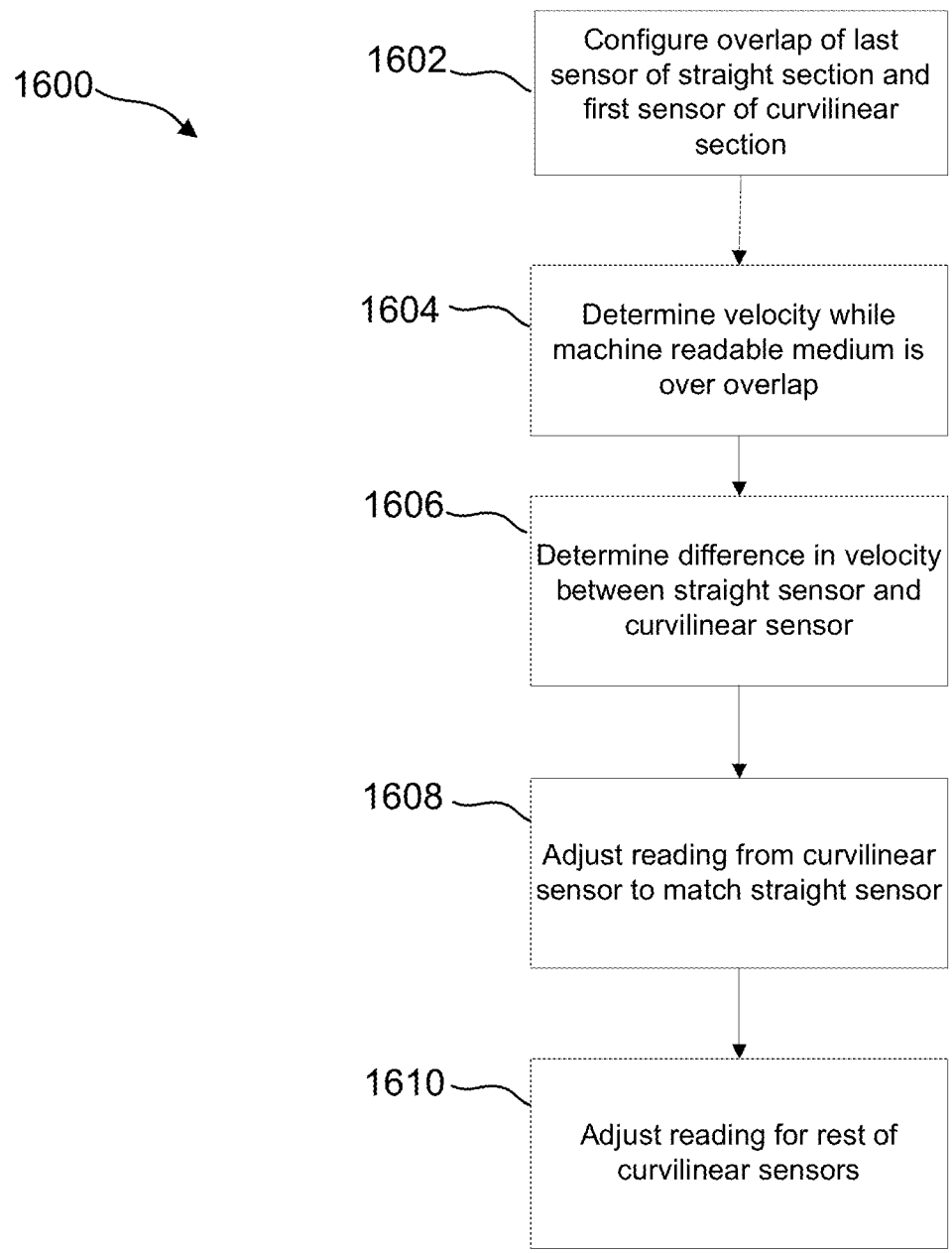
FIG. 16 illustrates a flowchart for a method of linearizing sensors on a curvilinear track section, according to an embodiment.

FIG. 16 illustrates a flowchart for a method 1600 of linearizing sensors on a curvilinear track section, according to an embodiment. At 1602, the location of the first sensor 1008 of the curvilinear track section 1000 is configured such that the extension 118 of the moving element 104 can overlap the first sensor 1008 and the last sensor 122 or 123 of an adjacent straight section 102 of track at the same time. The area where the extension overlaps both sensors 1008 and 122 or 123 may be called the "overlap region".

At 1604, a moving element 104 with the extension 118 is passed through the overlap region. While the moving element is in the overlap region, a moving element 104 velocity reading is read from both the last sensor 122 or 123 of the straight section 102 and the first sensor 1008 of the curvilinear track section 1000. At 1606, the difference in the readings from the sensors 1008, 122, 123 is determined.

At 1608, the difference in the readings is used to adjust the sensor reading from the first sensor 1008 of the curvilinear track section 1000. In adjusting the readings from the first sensor 1008 of the curvilinear track section 1000, a predetermined position table may be used. In an example, the last sensor 122 or 123 of the straight section 102 indicates the moving element 104 is moving at 0.200 m/sec, a predetermined position table may be used for the first sensor 1008 of the curvilinear track section 1000 such that the readings coming from the first sensor 1008 of the curvilinear track section 1000 are adjusted to match the 0.200 m/sec.

At 1610, the position adjustment determined at 1608 may be used to adjust the other sensors 1008 around the curvilinear track section 1000. Again, in adjusting the readings from the other sensors 1008 of the curvilinear track section 1000, a predetermined position table may be used.

Figure 17:
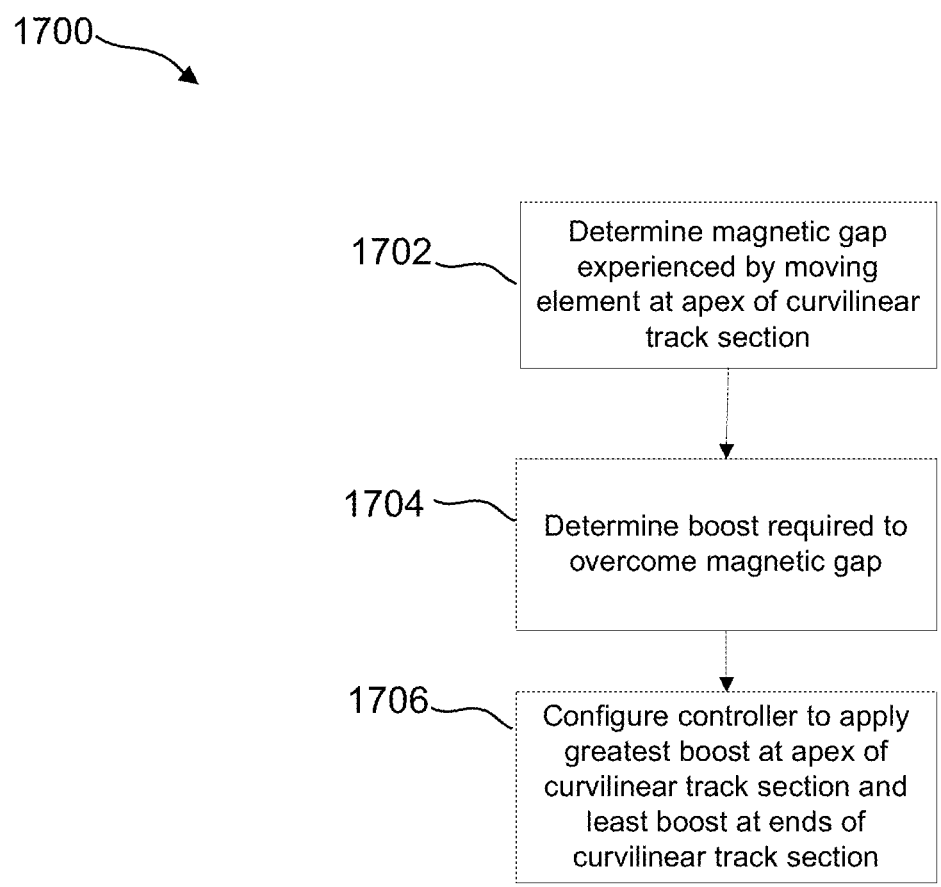
FIG. 17 illustrates a flowchart for a method of moderating magnetic gap on a curvilinear track section, according to an embodiment.

FIG. 17 illustrates a flowchart for a method 1700 of moderating magnetic gap on a curvilinear track section, according to an embodiment. An increase in magnetic gap may be formed as the moving element 104 traverses through the curvilinear track section 1000. The magnetic gap is the distance between the magnets of the moving element 104 and the curvilinear track section 1000. The magnetic gap may increase as the moving element 104 traverses through the curvilinear track section 1000 until the magnetic gap may be at its greatest at the apex of the curvilinear track section 1000. A magnetic gap may have unwanted effects as it may reduce the magnetic coupling of the moving element 104 to the curvilinear lamination stack 708. At 1702, the size of the magnetic gap is determined.

Due to this gap, a boost in current to the motor coil 714, resulting in more thrust on the moving element 104, may be applied as the moving element 104 approaches and traverses through the region of greatest magnetic gap. The boost in current, and thus thrust, may eliminate the gap by increasing the magnetic field between the moving element 114 and the curvilinear track section 1000. A boost may be applied at any suitable scale factor of current, for example, 1.5 times, 2.0 times, or the like. At 1704, the appropriate scale factor of boost is determined. The appropriate scale factor may, at least partially, overcome the magnetic gap at the region of greatest magnetic gap.

At 1706, the zone controller 602 is configured to apply the scale factor determined at 1704 when the moving element is at the region of greatest magnetic gap, typically when the moving element 104 is at the apex of curvilinear track section 1000. The zone controller 602 is also configured to provide the least boost, or no boost, when the moving element 104 is at either end of the curvilinear track section 1004. In between the ends and the apex of the curvilinear track section 1000, the zone controller 602 may be configured to apply a gradual gradient of boost or a stepped gradient of boost starting from the lowest boost at the ends of the curvilinear track section 1000 to the greatest boost at the apex of the curvilinear track section 1000.

In the preceding description, for purposes of explanation, numerous details are set forth in order to provide a thorough understanding of the embodiments. However, it will be apparent to one skilled in the art that these specific details may not be required. In other instances, well-known structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

We claim:

1. A curvilinear track section of a linear motor system operatively associated with a moving element having a machine readable medium, the curvilinear track section comprising:
   a curvilinear track portion having a curved shape;
   a plurality of sensors provided to the curvilinear track portion such that each of the plurality of sensors is oriented perpendicular to a direction of motion of the moving element and the plurality of sensors are configured such that the machine readable medium will overlap at least two of the plurality of sensors simultaneously; and
   a controller that determines a position of the moving element on the curvilinear track section based on readings from the sensors.

2. The curvilinear track section according to claim 1, wherein the controller calculates a velocity of the moving element based on the sensor readings and determines the position of the moving element based on the calculated velocity.

3. The curvilinear track section according to claim 1, wherein a first sensor of the plurality of sensors is calibrated based on the calibration of a last sensor on a straight track portion immediately preceding the curvilinear track section.

4. The curvilinear track section according to claim 1, wherein the curvilinear track portion has at least one region with a clothoid profile.

5. The curvilinear track section according to claim 1, wherein the curvilinear track portion provides a transition to a straight track portion without introduction of a magnetic bump causing a jerk problem.

6. The curvilinear track section according to claim 1, wherein the plurality of sensors are oriented as two rows of offset sensors.

7. The curvilinear track section according to claim 1, wherein the curvilinear track portion is comprised of a plurality of curvilinear lamination portions into the suitable shape.

8. The curvilinear track section according to claim 1, wherein the curvilinear track portion is adjacent a straight track portion and has a constant curvilinear region distally away from the straight track portion.

9. The curvilinear track section according to claim 1, wherein the curvilinear track portion comprises:
   a first slot grouping from an exterior edge of the curvilinear track portion, wherein the first slot grouping is at a first predetermined angle relative to the exterior edge of the curvilinear track portion;
   a second slot grouping from the exterior edge of the curvilinear track portion, wherein the second slot grouping is at a second predetermined angle relative to the exterior edge of the curvilinear track portion; and
   motor units inserted into the first and second slot groupings.

10. The curvilinear track section according to claim 9, wherein each of the first and second slot groupings comprise pairs of slot groupings and the pairs of slot groupings interleave.

11. The curvilinear track section according to claim 9, wherein a depth of each slot depends on the angle of the slot relative the exterior edge of the curvilinear track portion.

12. The curvilinear track section according to claim 9, wherein a depth of the slot on one end of the first slot grouping and a depth of the slot on another end of the first slot grouping are approximately equal to a depth of a slot on a straight section of the linear motor system and depths of slots in between the slot on one end and the slot on another end are deeper.

13. The curvilinear track section according to claim 9, wherein the curvilinear track portion and the first and second slot groupings provide a sinusoidal angular velocity profile for moving elements on the curvilinear track section.

* * * * *